(12) United States Patent (10) Patent No.: US 8,758,720 B2
Mukhopadhyay (45) Date of Patent: Jun. 24, 2014

(54) HIGH PURITY WATER PRODUCED BY REVERSE OSMOSIS

(76) Inventor: Debasish Mukhopadhyay, Palo Alto, CA (US)

( * ) Notice: Subject to any disclaimer, the term of this patent is extended or adjusted under 35 U.S.C. 154(b) by 0 days.

(21) Appl. No.: 11/342,135

(22) Filed: Jan. 26, 2006

(65) Prior Publication Data

US 2006/0231491 A1 Oct. 19, 2006

Related U.S. Application Data

(60) Continuation of application No. 09/243,237, filed on Feb. 2, 1999, now abandoned, which is a division of application No. 08/909,861, filed on Aug. 12, 1007, now Pat. No. 5,925,255.

(60) Provisional application No. 60/077,189, filed on Aug. 12, 1996, provisional application No. 60/036,682, filed on Mar. 1, 1997.

(51) Int. Cl.
*C01B 5/00* (2006.01)
*C01B 13/00* (2006.01)
*B01D 61/00* (2006.01)
*C02F 1/28* (2006.01)
*C02F 1/42* (2006.01)

(52) U.S. Cl.
USPC ........ 423/580.1; 210/652; 210/639; 210/653; 210/900; 210/663; 210/908; 423/579

(58) Field of Classification Search
CPC ...... C01B 5/00; C01B 13/0207; C01B 3/042; C01B 13/00; C01B 13/0281; C01B 3/045; C01B 13/0203; C01B 13/0214; C01B 13/08; C01B 2203/0261; C01B 2203/0405; C01B 2203/062; C01B 2203/066; C01B 31/01
USPC ........ 210/652, 638, 900, 653, 663, 639, 908, 210/640; 423/579, 580.1; 426/66
See application file for complete search history.

(56) References Cited

U.S. PATENT DOCUMENTS

| | | |
|---|---|---|
| 3,423,311 A | 1/1969 | Heatherington |
| 3,707,464 A | 12/1972 | Burns et al. |
| 3,715,287 A | 2/1973 | Johnson |
| 3,721,621 A | 3/1973 | Hough |
| 3,770,625 A | 11/1973 | Wallis et al. |

(Continued)

FOREIGN PATENT DOCUMENTS

| | | |
|---|---|---|
| CN | 0139569 A | 2/1990 |
| CN | 1011403 B | 1/1991 |

(Continued)

OTHER PUBLICATIONS

Magara et al., Development of boron reduction system for sea water desalination, Desalination 118 (1998) 25-33.*

(Continued)

*Primary Examiner* — Ana Fortuna
(74) *Attorney, Agent, or Firm* — R. Reams Goodloe, Jr.

(57) ABSTRACT

High purity water produced by reverse osmosis. A feedwater is pretreated to remove hardness and non-hydroxide alkalinity, and the pH is raised to 8.5 or more to ionize solute species such as boron that are sparingly ionized when in neutral or near neutral pH aqueous solution. Ultrapure water resulting is suitable for industrial use.

22 Claims, 11 Drawing Sheets

(56) References Cited

U.S. PATENT DOCUMENTS

| | | | |
|---|---|---|---|
| 3,823,086 A | 7/1974 | Schmidt | |
| 3,870,033 A | 3/1975 | Faylor et al. | |
| 3,953,580 A | 4/1976 | Allen et al. | |
| 3,964,999 A | 6/1976 | Chisdes | |
| 3,985,648 A | 10/1976 | Casolo | |
| 4,182,676 A | 1/1980 | Casolo | |
| 4,235,715 A | 11/1980 | Wiegert | |
| 4,321,145 A | 3/1982 | Carlson | |
| 4,430,226 A | 2/1984 | Hegde et al. | |
| 4,434,057 A | 2/1984 | Marquardt | |
| 4,532,045 A | 7/1985 | Littmann | |
| 4,532,047 A | 7/1985 | Dubin | |
| 4,548,716 A | 10/1985 | Boeve | |
| 4,574,049 A | 3/1986 | Pittner | |
| 4,698,153 A | 10/1987 | Matsuzaki et al. | |
| 4,755,298 A | 7/1988 | Grinstead | |
| 4,820,421 A | 4/1989 | Auerswald | |
| 4,824,574 A | 4/1989 | Cadotte et al. | |
| 4,879,041 A * | 11/1989 | Kurokawa et al. | 210/640 |
| 4,900,450 A | 2/1990 | Schmidt | |
| 4,917,806 A | 4/1990 | Matsunaga et al. | |
| 4,969,520 A | 11/1990 | Jan et al. | |
| 4,995,983 A | 2/1991 | Eadie et al. | |
| 5,028,336 A | 7/1991 | Bartels et al. | |
| 5,061,374 A | 10/1991 | Lewis | |
| 5,073,268 A | 12/1991 | Saito et al. | |
| 5,174,901 A | 12/1992 | Smith | |
| 5,178,766 A | 1/1993 | Ikeda et al. | |
| 5,236,722 A | 8/1993 | Schroeder | |
| 5,246,586 A | 9/1993 | Ban et al. | |
| 5,246,589 A | 9/1993 | Nichols | |
| 5,250,185 A * | 10/1993 | Tao et al. | 210/654 |
| 5,266,203 A | 11/1993 | Mukhopadhyay | |
| 5,292,439 A | 3/1994 | Morita et al. | |
| 5,332,388 A | 7/1994 | Schuerch et al. | |
| 5,338,456 A | 8/1994 | Stivers | |
| 5,352,345 A | 10/1994 | Byszewski et al. | |
| 5,358,640 A | 10/1994 | Zeiher et al. | |
| 5,385,664 A | 1/1995 | Oinuma et al. | |
| 5,476,591 A | 12/1995 | Green | |
| 5,518,624 A * | 5/1996 | Filson et al. | 210/651 |
| 5,529,689 A | 6/1996 | Korin | |
| 5,571,419 A | 11/1996 | Obata et al. | |
| 5,573,662 A * | 11/1996 | Abe et al. | 210/188 |
| 5,573,666 A | 11/1996 | Korin | |
| 5,645,727 A * | 7/1997 | Bhave et al. | 210/651 |
| 5,665,783 A | 9/1997 | Katzakian, Jr. et al. | |
| 5,670,053 A * | 9/1997 | Collentro et al. | 210/652 |
| 5,695,643 A | 12/1997 | Brandt et al. | |
| 5,766,479 A * | 6/1998 | Collentro et al. | 210/639 |
| 5,811,012 A | 9/1998 | Tanabe et al. | |
| 5,814,224 A | 9/1998 | Khamizov et al. | |
| 5,997,745 A | 12/1999 | Tonelli et al. | |
| 6,120,689 A | 9/2000 | Tonelli et al. | |
| 6,267,891 B1 | 7/2001 | Tonelli et al. | |
| 6,398,965 B1 * | 6/2002 | Arba et al. | 210/652 |
| 6,464,867 B1 * | 10/2002 | Morita et al. | 210/202 |
| 7,097,769 B2 | 8/2006 | Liberman et al. | |
| 7,491,334 B2 | 2/2009 | Comstock | |
| 7,815,804 B2 | 10/2010 | Nagghappan | |

FOREIGN PATENT DOCUMENTS

| | | |
|---|---|---|
| DE | 1792304 A2 | 3/1972 |
| DE | 1792304 | 8/1975 |
| DE | 2607737 A2 | 9/1976 |
| DE | 19603494 A1 | 8/1997 |
| DE | 19603494 C2 | 2/1998 |
| DE | 19603494 C2 | 2/1998 |
| EP | 0089189 B1 | 6/1986 |
| EP | 0417506 A1 | 3/1991 |
| EP | 0474370 A1 | 3/1992 |
| EP | 0644160 A2 | 3/1995 |
| EP | 0644160 A3 | 3/1995 |
| EP | 0474370 B1 | 10/1996 |
| EP | 0644160 B1 | 4/1998 |
| EP | 0946268 B1 | 7/2003 |
| GB | 2043045 A | 10/1980 |
| GB | 2078133 A | 1/1982 |
| GB | 2159810 A | 12/1985 |
| GB | 2295822 A | 6/1996 |
| GB | 2309 222 A | 7/1997 |
| JP | 50-75987 A2 | 6/1975 |
| JP | 50-88017 | 7/1975 |
| JP | 53-4777 | 1/1978 |
| JP | 54-69579 | 6/1979 |
| JP | 54-83688 | 7/1979 |
| JP | 55-012284 B1 | 4/1980 |
| JP | 56-110887 | 9/1981 |
| JP | 58-6297 | 1/1983 |
| JP | 58-118538 | 4/1983 |
| JP | 58-122084 | 7/1983 |
| JP | 59-112890 | 6/1984 |
| JP | 60-125208 | 7/1985 |
| JP | 60-190298 | 9/1985 |
| JP | 61-86905 | 5/1986 |
| JP | 61-181590 | 8/1986 |
| JP | 62-204892 | 9/1987 |
| JP | 62-204893 | 9/1987 |
| JP | SHO 62-204892 A2 | 9/1987 |
| JP | 62-294484 A2 | 12/1987 |
| JP | 1-231988 | 9/1989 |
| JP | 02-207888 A2 | 8/1990 |
| JP | 02-227185 A2 | 9/1990 |
| JP | 139106 | 10/1991 |
| JP | 05-012040 B2 | 2/1993 |
| JP | 05-269463 A2 | 10/1993 |
| JP | 6-233 | 1/1994 |
| JP | 6-023357 A | 2/1994 |
| JP | 6-63549 | 3/1994 |
| JP | 06-049191 B2 | 6/1994 |
| JP | 6-254551 | 9/1994 |
| JP | 6-328070 | 11/1994 |
| JP | 7-16565 | 1/1995 |
| JP | 7-16566 | 1/1995 |
| JP | 7-116648 | 5/1995 |
| JP | 7-163979 | 6/1995 |
| JP | 7-195072 | 8/1995 |
| JP | 8-39066 | 2/1996 |
| JP | 08-029315 B2 | 3/1996 |
| JP | 8-150400 | 5/1996 |
| JP | 9-1141 | 1/1997 |
| JP | 9-57261 | 3/1997 |
| JP | 10-85743 | 4/1998 |
| SU | 632656 | 11/1978 |
| WO | WO-98/06483 | 2/1998 |

OTHER PUBLICATIONS

Yasumoto Magara et al. "Development of boron reduction system for sea waerdesalination", desalination 118 (1998)25-34.*
Kaitei Josuido Kogaku Enshu (4$^{th}$ Edition), Section 6.8.3, Water Supply Engineering Handbook, published by Gakken Corporation; Mar. 2, 1990. (Japanese language—9 pages) + English translation Section 6.8.3 ph Control Equipment (2 pages).
Mitsubishi Kasei, DIAION, Ion Exchange Resin/Synthetic Absorbent Manual II, Applications ( Jun. 1, 2000) (Japanese language—8 pages) + English translation—9 pages).
Caplus, ACS on STN, JP60125208, Japan Organo Co., Ltd., [Regeneration of] (1 page).
Patent Abstracts of Japan, Publication No. 60125208A, Regeneration of Reverse Osmosis Membrane Apparatus, Ito Kakichi, (1 page) (Jul. 4, 1985).
Encyclopedia of Chemical Technology, Fourth Edition, vol. 14, Imaging Technology to Lanthanides (26 pages).
Filmtec FT30 Membrane Elements,—5 System Design, Dec. 1991, Technical Manual (2 pages).
Reverse Osmosis, Membrane Technology, Water Chemistry, and Industrial Applications, Zahid Amjad, 11-High Purity Water Production Using Reverse Osmosis Technology, Pittner (9 pages), pp. 346-349 (1993).

(56) References Cited

OTHER PUBLICATIONS

▶ Boron Removal From Seawater using FILMTEC High Rejection SWRO Membranes, Jorge Redondo, Markus Busch, Jean Pierre De Witte, Feb. 20, 2003, Desalination 156 (2003) 229-239 (10 pages).
JP-50-075987-A2 ( Jun. 1975)—Derwent Abstract of Kokai (2 pages).
DE-1792304-B (Aug. 1975)—Derwent Abstract to issued patent (1 page).
DE-2607737-A1 (Sep. 1976)—Derwent Abstract to unexamined patent application (1 page).
JP-53-004777-A2 (Jan. 1978)—Kokai Abstract, Jirou Kijima, Desalting Apparatus (1 page).
JP-54-069579-A2—(Jun. 1979)—Kokai Abstract, Sumio Takadono, Separating Method for Solution, (1 page).
JP-54-083688-A2 (Jul. 1979)—Kokai Abstract, Jirou Kijimi, Desalting Apparatus of Sea Water, (1 page).
JP-56-139106-A2 (Oct. 1981)—Kokai Abstract, Teruki Tsukamoto, Classification, Purification and Concentration of Solutes, (1 page).
JP-58-118538-A2 (Jul. 1983)—Dialog Abstract of Kokai, Komura Akio, et al, Recovery of Organic Acid, (1 page).
JP-58-122084-A2 (Jul. 1983)—Kokai Abstract, Koujitsu Hiroki, Water Producing Method by Desalting of Sea Water, (1 page).
JP-59-112890-A2 (Jun. 1984)—European Patent Office, Patent Abstracts of Japan, Jun. 29, 1984, Application No. 57222155, Urai Norihisa, (1 page).
JP 59112890, Publication Date: Jun. 9, 1984, Desalination by Reverse Osmosis Membrane Device Yokoyama Fumio, Applicant: Organo KK Application No. JP19820222155 19821220 (1 page).
JP 59112890, Publication Date: Jun. 29, 1984, Patent Abstracts of Japan, Application No. 57222155, Urai Norihisa (1 page).
JP-59-112890-A2 (Jun. 1984)—Abstract—Figures—Tables, Derwent Publications Ltd., London, GB, AN 1984-19809, XP002147898, Japan Organo Co. Ltd. (1 page).
JP-59-112890-A2 (Jun. 1984)—Chemical Abstracts, vol. 101, No. 22, Nov. 26, 1984, Columbus, Ohio, US, Abstract No. 19754, XP002147895, Desalination by Reverse Osmosis Membrane, (1 page).
JP-62-110795-A2 (Jun. 1987)—Patent Abstracts of Japan, Published: May 21, 1987, Device for Producing High Purity Water, Inagaki Kiyohiko, et al, (1 page).
JP-62-110795-A2 (May 1987)—Delphion Abstract; Publication Date: May 21, 1987, Device for Producing High Purity Water, Inagaki Kiyohiko, et al, (2 pages).
JP-62-294484-A2 (Dec. 1987)—European Patent Office, Patent Abstracts of Japan,, Reverse Osmosis Treatment of Water Containing Silica at High Concentration, Mitsukami Yoshimichi (1 page).
JP 62-294484 (Dec. 1987) Patent Abstracts of Japan, Application No. 61-138486, Reverse Osmosis Treatment of Water Containing Silica at High Concentration, Ushigoe Kenichi, et al, (2 pages).
JP-62-294484-A2 (Dec. 1987)—Delphion Abstract, Ushigoe Kenicki, et al, (1 page).
JP62294484,(Dec. 1987) Abstract: Application No. JP19860138486 19860613, Reverse Osmosis Treatment of Water Containing Silica at High Concentration, Ushigoe Kenichi, document bibliography and Abstract; data supplied from esp@cenet database (1 page).
J62294484 (Dec. 1987) Abstract, XP 002147896 (1 page).
J62294484 (Dec. 1987) Abstract, XP 002147894, Chemical Abstracts, Columbus, Ohio US, vol. 108, No. 20, Noted as p. 379, (1 page).
JP-63-028486-A2 (Feb. 1988)—Patent Abstracts of Japan, Application No. 6117235, Method for Removing Dissolved Carbon Dioxide in Pure Water Producing Apparatus, Ushigoe Kenichi, (1 page).
JP-63-028486-A2 (Feb. 1988)—Delphion Abstract; Method for Removing Dissolved Carbon Dioxide in Pure Water Producing Apparatus, Ushigoe Kenichi (2 pages).
JP-02-052088-A2 (Feb. 1990)—Patent Abstracts of Japan, Application No. 63-201961, Apparatus for Making Desalted Water, Endou Shigemi, et al (1 page).
JP-02-052088-A2 (Feb. 1990)—Patent Abstracts of Japan, Application No. 63201961, Apparatus for Making Desalted Water, Endou Shigemi, et al, (2 pages).
JP-02-052088-A2 (Feb. 1990)—Delphion Abstract, Apparatus for Making Desalted Water, Endou Shigemi, (2 pages).
JP-02-227185-A2 (Sep. 1990)—Patent Abstracts of Japan; Application No. 01046643, Removal of Dissolved Silica, Ichijo Toshitaka, et al, (1 page).
JP-02-227185-A2 (Sep. 1990)—DialogIP Document Abstract, Ichijo Toshitaka, et al (1 page).
JP-02-227185-A2 (Sep. 1990)—Delphion Abstract; Removal of Dissolved Silica, Ichijo Toshitaka, et al, (2 pages).
JP-02-227185-A (Sep. 1990)—Delphion, Derwent Abstract, Removing Dissolved Silica From Water, et al, Assignee: Hibiya Sogo Setsubi KK, (2 pages).
JP-04-118004-A2 (Apr. 1992)—Application No. 02235899, Patent Abstract of Japan, Method for Removing Gas Dissolving in Liquid, (2 pages).
JP-05-012040-B4 (Feb. 1993) Delphion, Derwent Abstract, Ichijo Toshitaka, et al (1 pages).
JP-05-269463 (Oct. 1993) Application No. 04066090, European Patent Office, Patent Abstracts of Japan, Membrane Separation Apparatus, Misumi Yoshiteru, (1 page).
JP-05-269463 (Oct. 1993)—Abstract, XP002147897 (1 page).
SU0632656T—(Nov. 15, 1978) Delphion Abstract, Method of Cleaning Waste Water, Vaks , et al, (1 page).
Akimitsu Miyahara, et al Practical Ion Exchange, Jan. 1, 1972, ; published by Kagaku Kogyo Ltd.,—Japanese language document with attached English translation.
Milstead, C.E. et al, Rejection of Carbon Dioxide and pH Effects in Reverse Osmosis Desalination. Desalination (1971), pp. 217-223.
Petersen, R.J., et al., Industrial Applications of the FT-30 Reverse Osmosis Membrane, World Filtration Congress III, 1989, pp. 541-547.
Larson, R.E., et al., Development of the FT-30 Thin-Film Composite Membrane, National Water Supply Improvement Association 9th Annual Conference and International Trade Fair, May 31-Jun. 4, 1981.
Lee, Eric, K.L., et al, Novel Composite Membranes, Bend Research Inc., For U.S. Department of Interior, Washington, D.C., Technical Completion Report, Contract No. 14 34 0001 1449, Apr. 1983.
Crabbe, Daniel, C.M., A Double Pass Reverse Osmosis System, Sep. 1976 (4 pages).
Nakamura, Tadashi, Seawater Desalination by Reverse Osmosis Process, Jul./Aug. 1981.
Cadotte, J., Evolution of Composite Reverse Osmosis Membranes, 1984.
1982 Report on Technological Development for Boiler Water by Reverse Osmosis, Exhibit Ko. No. 1., Mar. 1983, Fresh Water Generation Promotion Center, pp. 1-11, 45-97.
Handbook of Water Purification, Editor Walter Lorch-London, MacGraw-Hill Cop. 1981, XVIII, 715 p. III.
Permasep Products Engineering Manual, E.I., du Pont de Nemours & Co., 1982. (vol. I) (vol. II).
Commercial Reverse Osmosis Membranes and Modules, Anthony E. Allegrezza, Jr. , Applications for High-Purity-Water Production, Edited by Bipin S. Parekh, 1988, Millipore Corporation, Bedford, Massachusetts.
Petersen, Cadotte, Buettner, Development of FT-30 Membranes in Spiral Wound Modules, Final Report, Contract No. 14-34-0001-8547, FilmTec Corporation, Oct. 1982.
Crabbe, Daniel C.M., A Double Pass Reverse Osmosis System, Industrial Water Engineering, Dec. 1976/Jan. 1977, Industrial Water Engineering, vol. 13, No. 6.
Handbook of Membrane Technology, pp. 184-199, Jul. 15, 1985, Japanese language document (title page in English language only).
Annual Research Report No. 42, Shikoku Electric Power Co., Ltd., Sep. 1983, Japanese language document (title page in English language only).
Zosui Gijutsu, Water Producing Technology, vol. 10, No. 2, pp. 13-22, 1984, Japanese language document (title page in English language only).

(56) References Cited

OTHER PUBLICATIONS

FT30 Membrane Description, Technical Bulletin, FilmTec Membranes (undated) (16 pages).
Description of the FT-30 Membrane, FilmTec Corporation, (undated) (8 pages).
Peterson, R.J., et al, Development of the FT-30 Thin-Film Composite Membrane for Desalting Applications, Paper presented at National Water Supply Improvement Association, Jul. 6-10, 1980, San Francisco, California.
Parks, C.S., and Abrams, I.M, Fundamentals of Ion Exchange in Water Treatment, Shamrock Chemical Company, presented at the 7th Annual Liberty Bell Corrosion Conference, 1969.
Reverse Osmosis Element Warranty, FilmTec Corporation (4 pages).
Larson, R.E, Cadotte, J.E., and Petersen, R.J., The FT-30 Seawater Reverse Osmosis Membrane—Element Test Results, FilmTec Corporation. Desalination, 38 (1981) 473-483.
Handbook of Membrane Technology, pp. 26-28, Jul. 15, 1983, Japanese language document (title page in English language only).
Dyke, C.A., Tao, F.T., Curtice, S., Tuohey, D., et al, Removal of Salt, Oil, and Boron From Oil Field Wastewater by High pH Reverse Osmosis Processing, (Tao, Curtice, Tuoney, Hobbs, Sides, Wieser), Texaco Inc., prepared for presentation at AICHE 1992 Annual Meeting, Miami Beach, Florida, Nov. 1-6, 1992 (25 pages).
Tao, F.T., et al Conversion of Oilfield Produced Water Into an Irrigation/Drinking Quality Water, SPE 26003,1993.
Aronovitch, H. et al, "Weakly Acidic Cation Performance Treating Water Containing High Iron" May/Jun. 1995.
▶ Auerswald, D., "Optimizing the Performance of Reverse Osmosis/ Continuous Electrodeionization System" May/Jun. 1996.
Nakagaki, M., et al, The Comprehensive Membrane Treatment Technology, vol. 1. (undated) (8 pages).
Separation/Concentration of Boric Acid and Its Salts, Permasep Technical Data, Technical Bulletin 402, Issued: May 8, 1972 (2 pages ).
Silica, Excerpt from Permasep Engineering Manual from Du Pont Company (1982) Bulletin 502, p. 14, Date: Dec. 1, 1982 (2 pages).
Aachener Membran Kolloquium, Preprints, Mar. 19-21, 1991 Aachen, IVT GVC-VDI Gesellschaft, Mar. 21, 1991 (15 pages).
English Translation—Aachener Membrane Colloquium, Preprints, Mar. 19 to 21, 1991, Aachen, Germany, Association of German Engineers (21 pages) Includes Verified Translation of Privileged Document—Translator—Morgan C. Larkin dated Jun. 3, 2004.
Isamu Sugiyama and Yoshitaka Yamaki, Ultraclean Technology Handbook, edited by Tadahiro Ohmi, The Primary Treatment System, (1993), (14 pages) Attached publication data, Library of Congress Cataloging (1 page).
Lewatit—Verlauf von Schlupfkurven bei unterschiedlichem Regeneriermittelaufwand (Jan. 12, 1966) (3 pages) (German language document).
Russian language (pp. 284-290 plus attached CAPLUS content sheet—Reverse-Osmotic Treatment of Silica-Containing Water— (glossary) from ISSN 0204-3556, 1992, T. 14, No. 4. (7 pages).
Treatment of Silicon Containing Waters by Reverse Osmosis F.N. Karelin, R.O. Khakimov, Moscow Institute of Structural Engineers, Received Oct. 9, 1991 Attached Summary of data bank—Chemical Abstract (1 page).
Permasep Engineering Manual from Du Pont Company (1982), Bulletin 502, p. 14, Date: Dec. 1, 1982 (2 pages).
Patent Abstracts of Japan, Publication No. 60-125208, (Apr. 7, 1985) Application No. 58-231471, Regeneration of Reverse Osmosis Membrane Apparatus, Ito Kakichi, (English language document) (2 pages) Attached Summary of data bank—Chemical Abstract (1 page).
Table of Contents, Publication No. Army TM 5-813-8, Water Desalination, Publication Date: Sep. 15, 1986, Chapter 8, Ion Exchange (8 pages).
Ullmann's Encyclopedia of Industrial Chemistry, vol. A23, Refractory Ceramics to Silicon Carbide (4 pages).
Embase database abstract, Water Science and Technology (1989).
Embase database abstract, Applied and Environmental Microbiology (1978).
Rompp Chemie Lexikon, Prof. Dr. Jurgen Falbe; Prof. Dr. Manfred Regitz (3 pages)(German language document).
Rompp Chemical Lexicon, #4 OPPS, (7 pages) (English language document of German language document) Attached Verification of Translation of Morgan C. Larkin dated Jun. 3, 2004.
Amber Hi Lites, No. 164, Summer, 1980, The Role of Silica in Water Treatment (Part I), Robert Kunin (7 pages).
Technifax, Alkalinity Relationships in Water Chemistry, Nalco Chemical Company (TF-84) (4 pages).
Rautenbach, R. and Groschl, A., Separation Potential of Nanofiltration Membranes, *Desalination*, 77 (1990) 73-84.
FilmTec Membranes—Producing Potable Water in Florida (1 page).
FilmTec Membranes—Membrane System Design Guidelines (2 pages).
FilmTec FT30 Membrane Elements, Technical Manual for FilmTec FT 30 Membrane Elements, Dec. 1991 (13 pages ).
DE1792304 (Aug. 28, 1975) Derwent World Patent DIALOG OneSearch , English language document (1 page).
The Delphion Integrated View: (Jul. 15, 1975) Inpadoc Record for Japanese Patent No. JP50088017A2 Appli. No. JP19730000136089, English language document.
53-004777 (Jan. 17, 1978) Patent Abstracts of Japan , Title: Desalting Apparatus English language document.
54-083688 (Jul. 3, 1979), Patent Abstracts of Japan, Title: Desalting Apparatus of Sea Water, English language document.
54-069579 (Jun. 4, 1979) Patent Abstracts of Japan, Title: Separating Method for Solution, English language document.
58-122084 (Jul. 20, 1983) Patent Abstracts of Japan, Title: Water Producing Method by Desalting of Sea Water, English language document.
JP-61-181590-A (Aug. 14, 1986) Patent Abstracts of Japan, Application No. 60023080 Treatment of Organic Waste Liquid, Ichiyanagi Naoto, et al (1 page).
The Delphion Integrated View: (Aug. 14, 1986) Inpadoc Record for Japanese Patent No. JP61-181590, Treatment of Organic Waste Liquid (1 page).
05-012040 (Jan. 22, 1993) Patents Abstracts of Japan, Title: Task Execution Control System, English language document.
05-269463A (Oct. 19, 1993) , Japanese Patent Office, Patent Abstracts of Japan, Application No. 04066090, Membrane Separation Apparatus (1 page).
05-269463 (1993) Patent & Utility Model Gazette DB, Document1/ 1, Machine Translation.
06-023357 (Jan. 2, 1994) Patent Abstracts of Japan, Title: Pure Water Production Apparatus.
The Delphion Integrated View: (Feb. 14, 1990) Inpadoc Record for Chinese Patent Application No. CN1039569A, Regeneration Process of Ion Exchange Resin by CO2 Desalting Parially (1 page).
CN1029569 (Application No. 89103379) Machine translation—English.
CN1039569 (Application No. 89103379) SIPO Search Abstract (1 page).
Industrial Water Engineering, A Double Pass Reverse Osmosis System for the Production of USP Water, Daniel C.M. Crabbe, vol. 13, No. 6, Dec. 1976/Jan. 1977.
Reclamation of Irrigation Field Drainage Water, Joseph McCutchen, et al.,; *Desalination*, 19, 153-160 (1976).
Ion Exchange Pretreatment Using Deslating Plant Concentrate for Regeneration, Cornelia van Hook, et al.; *Desalination*, 19 (1976) 471-479.
Design Parameters and Operation of Small and Medium Size Municipal Reverse Osmosis in North America, Earl Johansen and Daniel Crabbe, *Desalination*, 20, (1977) 53-60.
Conjunctive Use of Reverse Osmosis and Thermally Regenerated Ion Exchange, Dudley W. Coillet and James E. Cruver—Desalination, 23, Elsevier Scientific Publishing Company, Amsterdam (1977).
High Recovery in the Yuma Desalting Plant, J.W. Kaakinen, et al.; *Desalination*, 23, (1977) 357-366.
Desalting in Australia: The Development of a New Process for Brakish Water, P.M. Sharples; B.A. Bolto, *Desalination*, 20 (1977) 391-401.

(56) References Cited

OTHER PUBLICATIONS

Five Year's Experience with Reverse Osmosis Systems Using Dupont 'Permasep' Permeators, C.P. Shields; *Desalination*, 28 (1979) 157-177 and p. 179 (p. 178 missing).
Water Softening by Diffusion Using Cation Exchange Membranes, B.S. Joshi and K.P. Govindan; *Desalination*, 38, (1981) 509-518.
Pretreatment and Operating Experience on Reverse Osmosis Plant in the Middle East, D. Pepper; *Desalination*, 38 (1981) 403-417.
Ion-Exchange Pretreatment for Scale Prevention in Desalting Systems, Theodore Vermeulen, et al.; *Desalination*, 47 (1983) 149-159.
Softening of Oilfield Produced Water by Ion Exchange for Alkaline Flooding and Steamflooding, R.B. Reyes, Dow Chemical USA, SPE 11706, (Mar. 23, 1983) 377-382 + 4 pages Tables.
Water Treatment, Principles and Practices of Water Supply Operations, American Water Works Association, Second Edition (cover pages (2x) with Copyright page (Library of Congress Cataloging in Publication Data) (1984).
Unique Double Pass Reverse Osmosis System Eliminates Ion Exchange for Many Deionization Applications, G. Pittner, R. LeVander, J. Bossler, IWC-85-46, (Nov. 7, 1985) (pp. 444-449).
Reverse Osmosis Desulphation Pretreatment: New Prototype Application, R. ZannonI, et al.; *Desalination*, 54 (1985) 333-342 (1985).
Design of the 50,000 M3/D Treatment Plants for Qasim S.A. Desalination of Brackism Water at 991 Recovery, P.J. de Moel, R.F. M. de Gier, et al.—Desalination, 55 (1985).
New Composite Charged Reverse Osmosis Membrane, Ikeda, Nakano, Ito, Kubota, Yamamoto, Desalination, 68 (1988) 109-119.
Measurements and Control in Reverse Osmosis Desalination, Albert B. Mindler, et al.; *Desalination*, 343-379, (1986).
Water and Wastewater Technology, Second Edition, Hammer, Copyright 1986.
Ultrapure Water System Design Consideration, P.S. Cartwright, P.E. (1987).
The Effect of pH on the Nanofiltration of the Carbonate System in Solution, A.E. Simpson, et al., *Desalination*, 64 (1987) 305-319.
Reverse Osmosis Technology, Applications for High-Purity-Water Production, Bipin S. Parekh, Library of congress Cataloging in Publication Data, Copyright 1988 (cover sheet (2 pages) (1988).
Reverse Osmosis Technology, Applications for High-Purity Water Production, Parekh, Library of Congress Cataloging in Publication Data) (cover pages) (1988).
Innovative Processes Provide Cogeneration Power Plant With the Ability to Utilize Oil Field Water, Vandeventer, Ford, Vera, 50th Annual Meeting International Water Conference, Pittsburgh, PA, Oct. 23-25, 1989.
Prepared Discussion of: Innovative Processes Provide Congeneration Power Plant with the Ability to Utilize Oil Field Water, G. Balmer, Exxon Research & Engineering Company, Florham Park, New Jersey, IWC-89-59 (Oct. 23, 1989) (p. 609).
Reverse Osmosis Technology for Wastewater Reuse, B.J. Marinias; *Water Sci. Tech.*, vol. 24, No. 9, pp. 215-227 (1991).
Betz Handbook of Industrial Water Conditioning, Ninth Edition (cover page) with attached Copyright page (Library of Congress Catalog Card No. 91-61770) (1991).
Control of Scaling in the South Brae Field, Hardy, Barthorpe, Plummer, Rhudy, Marathon Oil Co., OTC 7058 (May 4, 1992).
Reverse Osmosis Process Successfully Converts Oil Field Brine Into Freshwater, Tao, Curtice, Hobbs, Sides, Wieser, Texaco Inc., Oil & Gas Journal, Sep. 20, 1993.
Advances in Water and Effluent Treatment, White, BHR Group Conference Series, Publication No. 8, 2nd International Conference (Dec. 1993).
Scale Formation and Fouling Problems Effect on the Performance of MSF and RO Desalination Plants in Saudi Arabia, Malik Al Ahmad and Farag Abdul Aleem, Desalination, 93 (1993) Elsevier Science Publishers BV Amsterdam.
High Purity Water Preparation, for the Semiconductor, Pharmaceutical, and Power Industries, Meltzer, Library of Congress Catalog Card No. 92-85421 (cover pages) (1993).

Scale Control in the South Brae Field, Hardy, Barthorpe, Plummer, Rhudy, SPE, Marathon Petroleum Technology Centre, May 1994.
Advanced Reverse Osmosis Membrane Module for Novel Ultrapure Water Production Process, T. Ikeda, et al., *Desalination*, 98 (1994) 391-400.
Use of Reverse Osmosis in a Chlor Alkali Plant, K. Gurumoorthy and T. Swaminathan; *Desalination*, 98 (1994) pp. 303-307.
What Every Reverse Osmosis Water System Manager Should Know, Kronmiller, Research and Development, King Lee Technologies, San Diego, CA, Desalination, 98, (1994), 401-411, Elsevier Science, BV Amsterdam.
FilmTec Membrane Elements, 4. System Design (Apr. 1995).
U.S. Filter, Exhibit B, p. B-1—FlexRO Modules Provide Rapid Response, Reliable Performance, Versatile Service (1995).
▶ 450 ppm Silica Sustained in Innovative Reverse Osmosis Technology, Dennis McBride, Intel Corporation, Rio Rancho, NM; Deb Mukhopadhyay, Independent Chemical Engineering Consultant, Palo Alto, CA, IWC-96-16 (1996) (pp. 145-152).
▶ Demineralization, Optimizing the Performance of a Reverse Osmosis/Continuous Electrodeionization System, Auerswald (May 1996).
▶ Membranes Solve North Sea Waterflood Sulfate Problems, Roy Davis, Ian Lomax, Mark Plummer, Technology, Nov. 26, 1996, Oil & Gas Journal (Nov. 1996).
▶ Membrane Technology Works on North Sea Platform, O'Donnell, Marathon Oil UK Ltd., Desulfating Injection Water—2 (Dec. 2, 1996).
▶ Maximum Recovery from Seawater Reverse Osmosis Plants in Kuwait, Al Shammiri and M. Al-Dawas—Desalination 110 (Mar. 1997).
▶ High Efficiency Reverse Osmosis System, D. Mukhopadhyay, S. Whipple, The 1997 16th Annual Semiconductor Pure Water and Chemicals, SPWCC. Part 1 (of 2), Santa Clara, (CSA ILLUMINA face sheet); Mar. 3-7, 1997, (1 pg) (Abstract only).
▶ Membranes—RO System That Reduces Membrane Scaling and Fouling Tendencies, Mukhopadhyay, Whipple, Ultrapure Water, Oct. 1997—UP140821 (7 pages).
▶ Evaluation of Technologies to Treat Oil Field Produced Water to Drinking Water or Reuse Quality, Glenn F. Doran, Frank H. Carini, Society of Petroleum Engineers, II SPE 38830 (Oct. 5, 1997).
▶ Development of Boron Reduction System for Sea Water Desalination, Magara, Tabata, Kohki, Desaliation, Department of Urban Environmental Engineering, (Sep. 1998).
▶ A New High Efficiency Reverse Osmosis Process, Shuichi Chino and Isamu Sugiyama, Nomura Micro Science Co., Ltd., Kanagawa, Japan, IWC-99-66 (1999) (pp. 510-517).
▶ Hero Process—Recovery/Reuse of Cooling Tower Blowdown and as a Preconcentrator for ZLD Application, C. Fritz, V.J. Nathan, Cooling Tower Institute, Paper No. TP01-10, (02/00/2001) (7 pages).
▶ High ph RO for Wastewater Treatment, K. Moftah, PE Pollution Engineering (Oct. 1, 2002) (9 pages).
▶ Hero Process Volume Reduction of Cooling Tower Blowdown as Preconcentrator for ZLD Application, Charles H. Fritz, Black & Veatch Corporation, Kansas City, MO, and Bipin R. Ranade, Aquatech International Corporation, Canonsburg, PA (IWC-01-50), Papers presented on Oct. 24, 2001 (pp. 343-349).
▶ Reducting Water Usage in Semiconductor Manufacturing, Ultrapure Water, Electro IQ, Technology Insights for Electronics Manufacturing, (Jun. 1, 2002) (8 pages including date reference sheet).
▶ An Economical New Zero Liquid Discharge Approach for Power Plants, Power-Gen International, Dec. 10-12, 2002, Fritz, Tiwari (Dec. 10, 2002).
▶ Process Selection for Power Plant ZLD Systems, Fritz, Preston, Black & Veatch Corporation, 877-355-7100, Copyright 2003 (2003).
▶ Saving Energy, Water, and Money with Efficient Water Treatment Technologies, FEMP, U.S. Department of Energy, DOE-EE-0294 (Jun. 2004).
▶ Filmtec Membranes, Producing Potable Water in Florida (Aug. 2004).
▶ Improving Process Water Efficiency Using High Efficiency Reverse Osmosis (HERO), M. Aragon, Sandia National Laboratories, Labs for the 21st Century (Oct. 6, 2004) (3 pages).

(56) References Cited

OTHER PUBLICATIONS

▶ Semiconductors, Part 1: Meeting Water Requirements for 300-MM FABS, Ultrapure Water, vol. 21, No. 8. (Nov. 2004) (8 pages).
▶ Semiconductors, Part 2: Implementation of a High-Purity Water System in a 300-MMFAB, Ultrapure Water, vol. 21, No. 9. (Dec. 2004) (6 pages).
▶ High-Purity Water System Upgrade in Singapore Using the HERO™ Process (High Efficiency Reverse Osmosis), Ionics, Jun, McClain, Mukhopadhyay, Seah (2004).
▶ Recovery and Reuse of Water From Effluents of Cooling Tower, S. Kaliappan, C. Sathish and T. Nirmalkumar, Center for Environmental Studies, Anna University, Chennai, India, J. Indian Inst. Sci., 85, 215-221, (Jul. 25, 2005).
▶ The Hero Treatment, Onsite Water Treatment, David Engel, The Journal for Decentralized Wastewater Treatment Solutions, Publication date: Nov./Dec. 2007 (9 pages).
▶ Veolia Water, Optimized Pretreatment and Unique Separation (OPUS™), webpage http://www.veoliawaterst.com/opus,en/[5/11/2011 4:11:26 PM] (May 11, 2011).
Permasep Products Engineering Manual, Dec. 1982, including: PEM Bulletin 101, Introduction to Permasep Products PEM Bulletin 201, Desalination System in Perspective PEM Bulletin 202, p. 2 PEM Bulletin 203, Ion Exchange PEM Bulletin 204, Electrodialysis (ED) PEM Bulletin 205, Distillation PEM Bulletin 301, The B-9 Permasep Permeator Product Bulletin No. 213, 4" Diameter B-9 Permasep Permeator, Model No. 0410, Product Specifications Product Bulletin No. 214, 4" Diameter B-9 Permasep Permeator, Model No. 0420, Product Specifications Product Bulletin No. 215, 4" Diameter B-9 Permasep Permeator, Model No. 0440, Product Specifications Product Bulletin No. 224, 10" Diameter B-9 Permasep Permeator, Model No. 0410, Product Specifications Product Bulletin No. 225, 8" Diameter B-9 Permasep Permeator, Model No. 0840, Product Specifications Product Bulletin No. 226, 8" Diameter B-9 Permasep Replacement Bundle, Model No. 0840R Product Bulletin No. 227, 10" Diameter B-9 Permasep Replacement Bundle, Model No. 0040R PEM Bulletin 302, B-9 Permasep Permeator, Factors Influencing Performance PEM Bulletin 303, RO System Design With B-9 Permasep Permeators PEM Bulletin 304, Commercial Applications of B-9 Permasep Permeators PEM Bulletin 305, Special Applications of B-9 Permasep Permeator PEM Bulletin 306, RO Membrane Comparisons PEM Bulletin 307, Cost of Brackish Water Desalting PEM Bulletin 401, The B-10 Permasep Permeator Product Bulletin No. 276, 8" Diameter B-10 Permasep Permeator, Model No. 6840, Product Specifications Product Bulletin No. 277, 8" Diameter B-10 Permasep Replacement Bundle, Model No. 6842R Product Bulletin No. 278, 8" Diameter B-10 Permasep Replacement Bundle, Model No. 6840R PEM Bulletin 402, B-10 Permasep Permeator Factors Influencing Performance PEM Bulletin 403, Seawater RO system Design With Permasep Permeators PEM Bulletin 404, Commercial Applications of B-10 Permasep Permeators PEM Bulletin 405, Economics of Seawater Desalination with Permasep Permeators PEM Bulletin 501, Introduction to Reverse Osmosis Pretreatment PEM Bulletin 502, Pretreatment for Membrane Scaling PEM Bulletin 503, Pretreatment for Metal Oxides PEM Bulletin 504, Pretreatment for Colloids PEM Bulletin 505, Pretreatment for Suspended Solids and Biological Matter PEM Bulletin 506, Pretreatment for Seawater RO Systems PEM Bulletin 507, Cleaning Procedures PEM Bulletin 508, Posttreatments for Permasep Permeators PEM Bulletin 509, Sterilizing (Sanitizing) Procedure PEM Bulletin G-1, Shipping, Handling and Storing Permasep Permeators PEM Bulletin G-2, RO System Check Lists PEM Bulletin G-3, Glossary.

\* cited by examiner

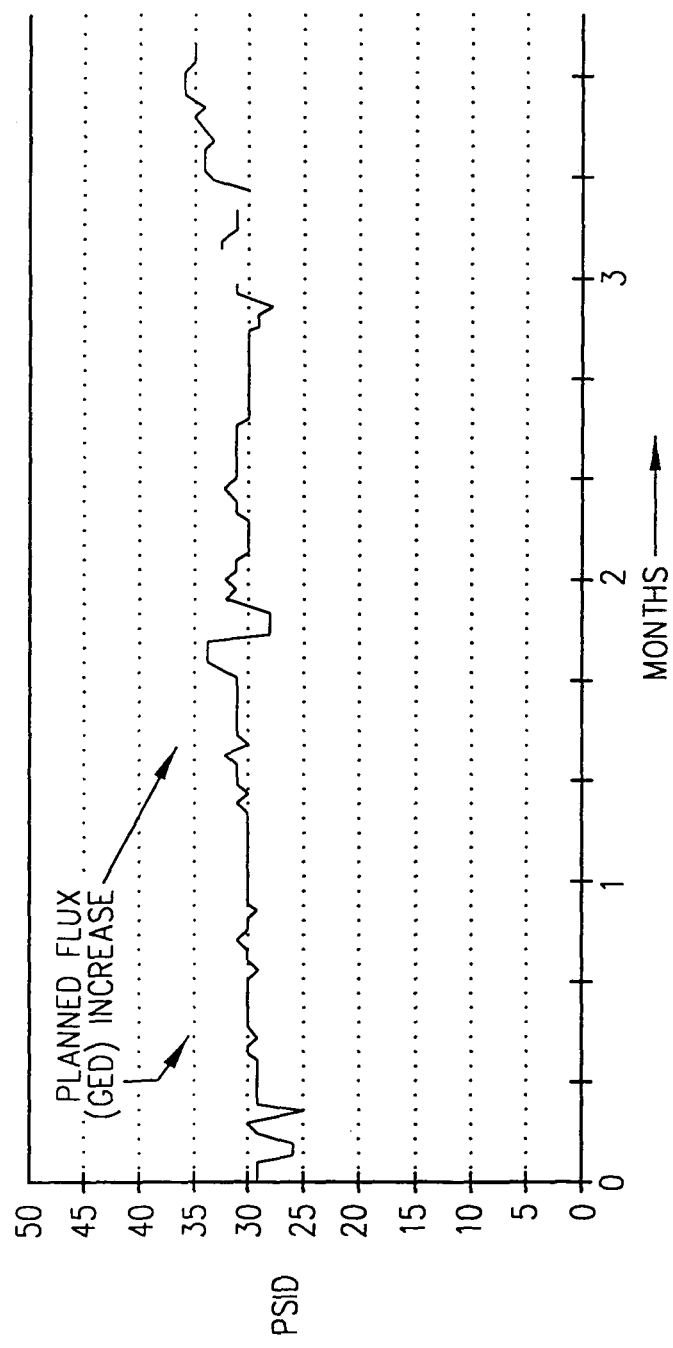

HIGH PURITY WATER PRODUCED BY REVERSE OSMOSIS

RELATED PATENT APPLICATIONS

This application claims priority from, and is a continuation of prior U.S. patent application Ser. No. 09/243,237 filed Feb. 2, 1999 now abandoned which claimed priority from and is a divisional of prior U.S. patent application Ser. No. 08/909, 861 filed Aug. 12, 1997 (now U.S. Pat. No. 5,925,255, issued Jul. 20, 1999), which claimed priority from prior U.S. Provisional Patent Application Ser. No. 60/077,189, filed Aug. 12, 1996, converted to Provisional Application from Non-Provisional U.S. application Ser. No. 08/695,615, and prior U.S. Provisional Patent Application Ser. No. 60/036,682, filed Mar. 1, 1997, the disclosures of each of which are incorporated herein in their entirety by this reference.

COPYRIGHT RIGHTS IN THE DRAWING

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

My invention relates to a method for the treatment of water in membrane based water treatment, purification, and concentration systems, and to apparatus for carrying out the method. In one embodiment, my invention relates to methods for feedwater pretreatment and for operation of reverse osmosis ("RO") equipment, which achieve increased solute rejection, thereby producing very high purity (low solute containing) product water, while significantly increasing on the on-stream availability of the water treatment equipment.

BACKGROUND

A continuing demand exists for a simple, efficient and inexpensive process which can reliably provide water of a desired purity, in equipment which requires a minimum of maintenance. In particular, it would be desirable to improve efficiency of feed water usage, and lower both operating costs and capital costs for high purity water systems, as is required in various industries, such as semiconductors, pharmaceuticals, biotechnology, steam-electric power plants, and nuclear power plant operations.

In most water treatment systems for the aforementioned industries, the plant design and operational parameters generally are tied to final concentrations (usually expressed as total dissolved solids, or "TDS") which are tolerable in selected equipment with respect to the solubility limits of the sparingly soluble species present. In particular, silica, calcium sulfate, and barium sulfate often limit final concentrations achievable. In many cases, including many nuclear power plants and many ultrapure water plant operations, boron or other compounds of similarly acting ampholytes have a relatively low rejection across membranes in conventionally operated RO systems, and may dictate design or operating limitations. More commonly, the presence of such compounds result in sufficiently poor reverse osmosis product water, known as permeate, that additional post RO treatment is required to produce an acceptably pure water. In any event, to avoid scale formation and resulting decreases in membrane thruput, as well as potential deleterious effects on membrane life, the design and operation of a membrane based water treatment plant must recognize the possibility of silica and other types of scale formation, and must limit water recovery rates and operational practices accordingly. In fact, typical RO plant experience has been that declines in permeate flow rates, or deterioration of permeate quality, or increasing pressure drop across the membrane, require chemical cleaning of the membrane at regular intervals. Such cleaning has been historically required because of membrane scaling, particulate fouling, or biofouling, or some combination thereof. Because of the cost, inconvenience, and production losses resulting from such membrane cleaning cycles, it would be advantageous to lengthen the time between required chemical cleaning events as long as possible, while nevertheless efficiently rejecting undesirable ionic species and reliably achieving production of high purity permeate.

Since the introduction and near universal adoption of thin film composite membranes in the mid to late 1980s, the improvements in RO technology have been evolutionary in nature. Operating pressure needed to achieve desired rejection and flux (permeate production rate per unit of membrane surface area, commonly expressed as gallons per square foot of membrane per day, or liters per square meter per day) has been slowly reduced, while average rejection of thin film composite membrane has improved incrementally.

Historically, brackish water RO systems have been limited in their allowable recovery and flux rates by the scaling and fouling tendencies of the feedwater. It would be desirable to reduce the scaling and fouling tendencies of brackish feedwater to the point where recovery limits would be dictated by osmotic pressure, and where flux rates can be increased substantially, compared to limits of conventional brackish water RO systems.

From a typical end user's point of view, several areas of improvement in RO technology—chlorine tolerance being one of them—are still sought. Thin film composite membranes, at least partly due to their surface charge and characteristics, are relatively prone to biological and particulate fouling. With certain feedwaters, particularly from surface water sources, membrane fouling and the frequent cleaning required to combat fouling can present some arduous, costly, and time-consuming operational challenges.

It is known that rejection of weakly ionized species, such as total organic carbon ("TOC"), silica, boron, and the like, is significantly lower than rejections for strongly ionized species as sodium, chloride, etc. Since the efficiency of post-RO ion exchange is largely determined by the level of the weak anions present in the RO permeate, it would be advantageous to remove (reject) as many weak anions as possible in the RO unit operation. In other words, by removing (rejecting) more silica (and boron) in the RO step, a higher throughput is achievable in the ion-exchange unit operation that follows the RO unit.

With the exception of an RO process disclosed in U.S. Pat. No. 4,574,049, issued Mar. 4, 1986 to Pittner for a REVERSE OSMOSIS SYSTEM, which reveals a double pass (product staged) RO system design, carbon dioxide typically represents the largest fraction of the anion load in RO permeate. However, a multiple pass RO configuration provides very little benefit under conventional RO system operating conditions, since the carbon dioxide content of permeate stays at the same (absolute) level and represents an even bigger fraction of the anion load. High rejection of weak anions in a single pass RO system is, therefore, considered to be another area where significant improvement is still sought.

In addition-to-increasing the rejection of the weakly ionized species, the increased rejection of strongly ionized species is also desired.

Recovery rate, or volumetric efficiency, is another parameter where improvements in RO system performance would be advantageous. A typical RO system operates at about 75 percent recovery, where only 75 percent of the incoming feed to RO is used beneficially, and the rest (25 percent) is discharged. With water becoming both more scarce and more costly throughout the world, increasing the maximum achievable recovery rate in an RO system is an important goal.

Increasing the operating flux is always important to end users, as increased flux reduces capital costs.

Simplification and cost reduction for post-RO unit operations is also sought by end users. This is because allowable levels of impurities in ultrapure watery have continually decreased with the ever tightening design rules in semiconductor device geometry. Thus, lower contaminant levels in the ultrapure water system are required. As a result, the cost and complexity of the post-RO system components have dramatically grown in recent years.

High purity water processing procedures and the hardware required for carrying them out are complex and expensive. In fact, the regenerable mixed bed ion exchange system represents, by far, the most expensive (and complicated) single unit operation/process in the entire ultrapure water treatment system. Thus, significant improvement in the characteristics of the RO treated water would appreciably reduce the overall ultrapure water system cost and complexity.

I am aware of various attempts, some in high purity water treatment applications and some in wastewater treatment applications, in which an effort has been made to improve the efficiency of the rejection of certain ions which are sparingly soluble in aqueous solution at neutral or near neutral pH. Such attempts are largely characterized by conventional hardness removal and then raising the pH with chemical addition. One such method is shown in U.S. Pat. No. 5,250,185, issued Oct. 5, 1993 to Tao, et al., for REDUCING AQUEOUS BORON CONCENTRATIONS WITH REVERSE OSMOSIS MEMBRANES OPERATING AT HIGH PH. In a preferred embodiment, his invention provides use of a conventional zeolite softener followed by a weak acid cation ion-exchanger operated in sodium form to remove divalent cations. Due to both equipment limitations and to process design considerations, his pretreatment steps are followed by the somewhat costly and otherwise undesirable step of dosing the feedwater with a scale inhibitor to further prevent hardness scales from forming. Also, although his method does provide a simultaneous hardness and alkalinity removal step, which is of benefit in many types of applications which are of interest to me, his method does not provide for a high efficiency in that removal step, as is evidenced by the fact that two additional downstream softening steps are required in his process. Moreover, his application pertains to, and is described and claimed with respect to oil field produced waters containing hydrocarbon compounds (containing carbon and hydrogen only, and generally not ionizable), whereas in applications which are of interest to me, such compounds are almost totally lacking. In applications of primary interest to me, a variety of naturally occurring organic acid such as humic and fulvic acids are present, particularly in surface waters presented for treatment.

Also, a method used in high purity water applications is disclosed in Japanese KOKAI No. Sho 58-112890, Published Jun. 29, 2984 by Yokoyama, et al., for a METHOD OF DESALINATION WITH A REVERSE OSMOSIS MEMBRANE UNIT. His examples show reverse osmosis units utilizing a pretreatment process of strong acid cation exchange resin ("SAC") for softening in one example, and without softening in the other example. While his process will work for certain feedwaters, it does not teach how operation at higher pH levels may be employed while still avoiding scaling of RO membranes.

In order to better understand my process; it is useful to understand some basic water chemistry principles. With respect to calcium carbonate ($CaCO_3$), for example, the likelihood of occurrence of precipitation on an RO membrane in the final reject zone may be predicted by use of the Langelier Index, sometimes known as the Langelier Saturation Index (LSI). See the Naico Water Handbook, copyright 1979, by McGraw-Hill. This index is generally formulated as follows:

$$LSI = pH_{reject} - pH_s$$

where $pH_s$=the pH at saturation of $CaCO_3$ (reject) and $$H_s = pCa + pAlk + C$$

and wherein:
  pCa=−log of $Ca^{++}$ ion concentration (moles/liter)
  pAlk=−log of $HCO_3^-$ ion conc. (moles/liter)
  C=a constant based on total ionic strength and temperature of the RO reject.

In a given RO reject water, in order to avoid carbonate scaling, it most preferable to keep the LSI negative, i.e. in a condition so that $CaCO_3$ will dissolve. However, in the field, it has been found that under- some conditions, with use of certain types of anti-scalant additives, an LSI of up to about +1.5 can be tolerated, without $CaCO_3$ scale formation resulting. In any event, at the pH of any given RO reject, $pH_s$ must be minimized in order to avoid undesirable scale formation. To put this into perspective, consider that in any RO pretreatment operation, it can be anticipated that there will always be at least some leakage of calcium from the softening step. Thus, depending upon the raw feedwater hardness and the pretreatment process scheme practiced, a lower limit on the achievable value of the pCa term, due to the concentration of the $Ca^{++}$ ion present in the treated RO feedwater, can be anticipated. Furthermore, in all events, the value of C is fixed by the total ionic strength and by the temperature. Thus, to keep the LSI in an acceptable range—in order to provide scale free RO operation—the leakage of calcium (as well as other hardness such as magnesium) becomes a critical factor. The Tao et al. patent, identified above, approaches this problem by providing various types of softeners in series. Specifically, he simply accepts the inevitably high capital and operating costs associated therewith. Yokoyama, on the other hand, evidently decided to limit RO operation to a pH which is consistent with the degree of calcium removal. When he operates with RO reject at a pH of 9, assuming 0.1 ppm of $Ca^{++}$ leakage from the ion exchange train disclosed, and a concentration factor of 5 ("5×") in the RO, his RO operation may be expected to provide an RO reject with an LSI of about −0.5. That LSI is acceptable for non-scaling operation, with or without scale inhibitors. However, if the pH in Yokoyama's example were increased to 11, for example, given the same pretreatment method, an LSI of about +2.4 might be expected. In such a case, the Langelier Saturation Index of the reject water would be well above the level where current anti-sealants have the ability to provide scale free RO operation.

Thus, for the most part, the prior art methods known to me have one or more of the following shortcomings: (a) they do not reliably achieve the extremely low hardness and non-hydroxide alkalinity levels necessary for essentially scale free operation at very high pH levels; (b) they rely on redundant and expensive capital equipment, with attendant operating costs, to minimize hardness leakage, (c) they depend primarily on hardness reduction to reduce the LSI of the RO reject (and do not include provisions for high efficiency dealkalization), and (d) they rely on anti-scaling additives to prevent scale formation. Thus, the advantages of my simple treatment process which exploits (a) hardness removal to very low residual levels, and (b) efficient dealkalization, to allow extended trouble free RO operation at high pH levels, are important and self-evident.

Moreover, because of upper concentration factor limits due to the tendency of scale to form, RO systems are often unable to use about twenty five (25%) or more of the raw feedwater. Also, at recoveries levels greater than approximately seventy five percent (75%) or somewhat lower, depending upon raw water chemistry, the control of chemical scaling and biological fouling in conventional RO systems becomes almost unmanageably difficult when trying to achieve long run times. Therefore, widespread commercial use of RO systems with water recovery in excess of about seventy five percent (75%) has not been accomplished.

As water is becoming increasingly expensive, or in short supply, or both, it would be desirable to increase the ratio of treated product water to raw water feed in RO systems. Therefore, it can be appreciated that it would be desirable to achieve reduced costs of water treatment by enabling water treatment at higher overall recovery rates rates than is commonly achieved today. Finally, it would be clearly desirable to meet such increasingly difficult water treatment objectives with better system availability and longer run times than is commonly achieved today.

In so far as I am aware, no one heretofore has thought it feasible to operate a reverse osmosis based water treatment system at higher than about pH 9, in continuous, sustainable, long term operations to produce a highly purified treated water product. The conventional engineering approach has been to design around or battle scale formation, by use of moderate pH, by limiting final concentration and resulting water recovery, by use of chemical additives. Historically, cellulose acetate membranes were limited in operation to a pH range of roughly 4 to 7. Newer polyamide and thin-film-composite type membranes have traditionally been operated in the pH range of roughly from about 4 to about 8. Although higher pH operation has occasionally been attempted for a few special purposes, it has usually been in non-silica related applications. And, although higher pH operation has been utilized in second pass RO applications where silica was of concern, in so far as I am aware, it has only been accomplished after a first pass RO operation with a neutral or near neutral pH of operation. In those cases where organics are of specific concern, then the pH may often range to below 5, and preferably, below 4.

In contrast to prior art methods for water treatment, the method taught herein uses the essential design philosophy of virtually eliminating any possible occurrence of scaling phenomenon during first pass operation at the maximum feasible pH using the available membranes, while maintaining the desired concentration factor, and taking the benefit of water recovery that results.

SUMMARY

I have now invented a novel water treatment method based on aggressive hardness and alkalinity removal, followed by membrane separation at high pH, to produce a high quality permeate with extremely low silica concentration.

In a unique feedwater treatment process, raw feedwaters of suitable chemical composition are treated with a weak acid cation ion exchange resin, operated in the hydrogen form, to simultaneously remove hardness and alkalinity. The weak acid cation ion exchange resins can be operated at incoming raw feedwater hardness and alkalinity levels well above those that would cause conventional ion exchange systems to fail due to hardness breakthrough.

The preferred treatment train design used in my wastewater treatment plant overcomes a number of important and serious problems. First, the low hardness, combined with virtual elimination of non-hydroxide alkalinity, substantially eliminates the precipitation of scale forming compounds associated with sulfate, carbonate, or silicate anions. Thus, cleaning requirements are minimized. This is important commercially because it enables a water treatment plant to avoid lost water production which would otherwise undesirably require increased treatment plant size to accommodate for the lost production during cleaning cycles. Second, the preferred high pH operational conditions enable a high degree of ionization to be achieved in various species which are sparingly ionized at neutral or near neutral pH in aqueous solution, to enable such species to be preferentially rejected by the membrane system. Finally, operation at high pH provides protection against biological contamination, thus preventing undesirable contamination of product water. At the preferred high operational pH, bacteria and endotoxins are effectively destroyed. In essence, water treatment systems operated according to the teachings herein normally operate at conditions which might ordinarily be considered cleaning conditions for conventional RO systems.

I have now developed a novel process design for use in treatment of water. My invention is defined in its broadest form by the scope of appended claims 1 (process) and 44 (apparatus). In one embodiment, the process involves treatment of a feedwater stream which is characterized by the presence of (i) hardness, (ii) alkalinity, and (iii) molecular species which are sparingly ionized when in neutral or near neutral pH aqueous solutions, to produce a low solute containing product stream and a high solute containing reject stream. The process involves effectively eliminating the tendency of the raw feedwater to form scale when the raw feedwater is concentrated to desired concentration factor at a selected pH, by effecting, in any order, one or more of the following (i) removing hardness from the raw feedwater stream, (ii) removing alkalinity from the raw feedwater stream, or (iii) removing dissolved gases created during the hardness removal step. Then, the pH of the feedwater is raised to a selected pH of at least about 8.5, or up to 9.0, or up to about 10, or preferably (with currently available thin film composite type membranes) to a range between 10 and 11, or otherwise in excess of 11, and more preferably to about 12 or somewhat more, until the benefits gained by high rejection rates of silica and other species is outweighed by the additional cost. With currently available thin film composite membranes, controlling the pH at up to about 10.5 provides most of the benefits of this method without compromise of long-term membrane life. The pH increase is accomplished by adding a selected base to the softened and dealkalated feedstream, preferably by direct injection or alternately by the use of anion ion-exchange. The pH increase urges the molecular species which are sparingly ionized when in neutral or near neutral pH toward increased ionization. An alternate concept is that the protonatable, i.e., proton accepting substances, or bases, are increased. The pH adjusted feedwater is then sent through membrane separation equipment, typically of the reverse osmosis type, but alternately of nanofiltration or other suitable type or configuration which is otherwise available, or which may in the future become available, and in which the current method may be practiced, to produce a reject stream and a product stream. The membrane separation equipment is ideally of the type which has a semipermeable membrane which which substantially resists passage of ionized species therethrough. It is important that in my process, the membrane separation equipment produces a product stream which is substantially free of the normally undesirable species which are sparingly ionized when in neutral or near neutral pH in aqueous solutions.

OBJECTS, ADVANTAGES, AND FEATURES

From the foregoing, it will be apparent that one important and primary object of the present invention resides in the provision of a novel method for treatment of water to reliably and continuously produce over long operational cycles a water product stream of a preselected extremely high purity quality standard.

More specifically, an important object of my invention is to provide a membrane based water treatment method which is capable of avoiding common scaling and fouling problems, so as to reliably provide a method of high purity water generation when operating at high efficiency.

Other important but more specific objects of the invention reside in the provision of a method for water treatment as described in the preceding paragraph which:

- allows the removal of hardness and alkalinity from a selected feedwater to be done in a simple, direct manner;
- has a minimum of unit process requirements; minimize or avoid complex chemical feed systems;
- requires less physical space than existing technology water treatment plants;
- is easy to construct, to start, and to service;
- has high efficiency rates, that is, they provide high product water outputs relative to the quantity of feedwater input to the water treatment plant;
- in conjunction with the preceding object, provide lower unit costs to the water treatment plant operator and thus to the water user, than is presently the case;
- in conjunction with the just mentioned object, results in less chemical usage than in most water treatment facilities, by virtually eliminating use of some types of heretofore commonly used chemical additives, particularly scale inhibitors.

A feature of one embodiment of the present invention is the use of a unique combination of weak acid cation ion-exchange with substantially complete hardness and alkalinity removal, and subsequent high pH RO operation, thereby enabling the water treatment plant to minimize the percentage of reject water. This results in high overall cycle efficiencies.

Another feature of the present invention is the use of a high pH operation to highly ionize weakly ionizable species such as silica, boron, or TOC, thus enabling operation with silica, boron, or TOC rejection levels considerably exceeding the limits of conventional RO treatment systems when treating feedwaters of comparable chemistry.

Yet another feature of the present invention is the capability to retrofit existing RO plants to operate according to the present process design, to increase capacity without increasing the RO membrane requirements.

Another feature of the present invention is the ability to provide higher purity product water while operating at higher flux levels than has heretofore been feasible with conventional RO system designs.

Other important objects, features, and additional advantages of my invention will become apparent to those skilled in the art from the foregoing, and from the detailed description which follows, and from the appended claims, in conjunction with the accompanying drawing.

BRIEF DESCRIPTION OF THE DRAWING

In the drawing, identical features shown in the several figures will be referred to by identical reference numerals without further mention.

FIG. 5 illustrates the differential pressure, in pounds per square inch versus time (PSID v. Months) for a reverse osmosis membrane employed in pilot reverse osmosis test equipment utilizing my novel process.

DETAILED DESCRIPTION

Figure 1:
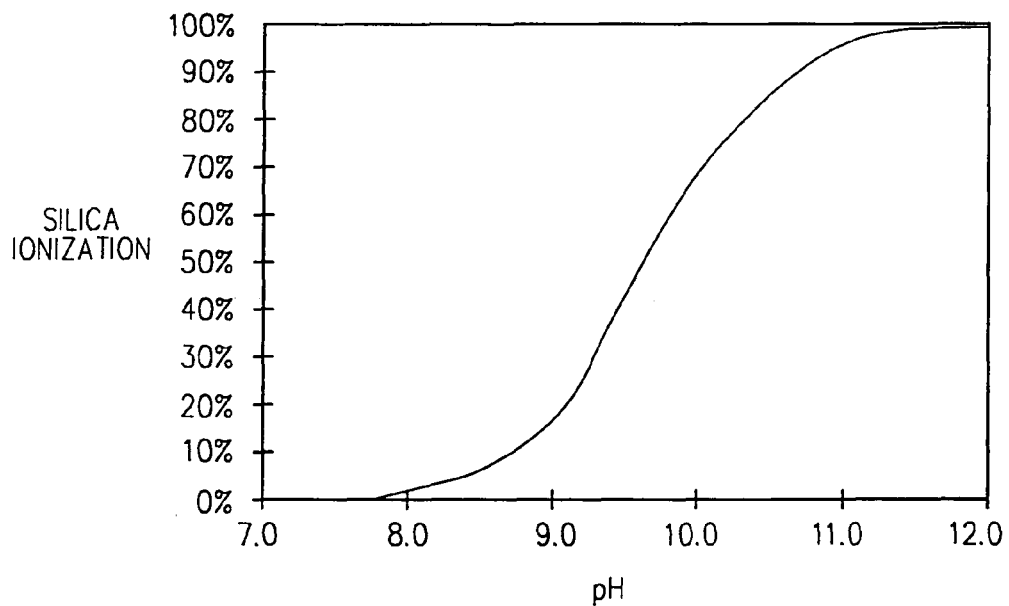
FIG. 1 illustrates the percentage ionization of silica ions in aqueous solution as a function of pH.

I have developed a new method for process design and operation of RO systems. This new method for process design and operation of RO systems has been thoroughly tested. The process has shown that it is capable of achieving important improvements in RO operational objectives.

Attributes which characterize my HERO™ brand RO process design and operation include:

(1) Very high rejection of all contaminants, especially weak acid anions such as TOC, silica, boron, etc.
(2) Very high achievable recovery—ninety percent (90%) or higher recovery can be achieved.
(3) Biological fouling is essentially eliminated.
(4) Particulate fouling is substantially reduced.
(5) Cleaning frequency is substantially reduced.
(6) Removal of chlorine from the feedwater may not be needed, due to the resulting chemical species present at the high operating pH, or in some cases, by eliminating the need to add chlorine in the first place.
(7) Addition of scale inhibitors is virtually eliminated.
(8) Substantially higher flux is achieved.
(9) Reduced overall capital cost, compared to conventional RO systems.
(10) Reduced overall operating cost, compared to conventional RO systems.
(11) The complexity of an ultrapure water system is significantly reduced.

The HERO brand RO system is highly site-specific. Individual process steps are customized to fit the specific feedwater at a specific site. Regardless of the difference in pretreatment process for different sites, one process parameter is common for all applications, namely that the RO system is operated at the highest feasible reject pH. Consistent with the highest allowable pH limit for currently available RO membranes (for example, pH 11.0 for FILMTEC® brand RO elements), a typical HERO brand RO system is designed to operate at pH of up to approximately 11, as measured in the RO reject stream.

Because of the very high concentration factors (i.e. percent recovery) allowed by my HERO brand RO process, the RO feed pH is correspondingly lower. For example, in a system operating at ninety percent (90%) recovery, a feed pH of 10.0 will produce a reject stream at an approximate pH of 11, provided that the RO feed is only slightly buffered by the presence of carbonate, phosphate, etc. Unlike conventional RO systems, typically operated at about seventy five percent (75%) recovery, a HERO brand RO system can be routinely operated at ninety percent (90%) or greater recovery, limited only by osmotic pressure of the RO reject. The pH increase from RO feed to reject is magnified at very high recoveries. Thus, the maximum allowable pH is specifically applicable for the RO reject conditions.

In order to operate an RO system with reject up to near pH 11, or at about pH 11, or above, several process conditions must be met in order to effectively eliminate the potential for scale formation on the RO membrane. Some of those process conditions are also necessary for operating an RO system at very high recovery rate. Such process conditions are as follows:

(1) Calcium, magnesium, strontium, and barium concentration in the RO feed must be substantially eliminated, preferably to near zero, and most preferably, to essentially zero.
(2) Aluminum, iron, and manganese content including organically bound species, as well as the presence of colloidal particles containing such materials, should be substantially eliminated, and preferably to near zero.
(3) Buffering anions (specifically bicarbonate, or carbonate, and/or phosphate species) should be reduced to as low of a level as can be practically achieved.

Figure 2:
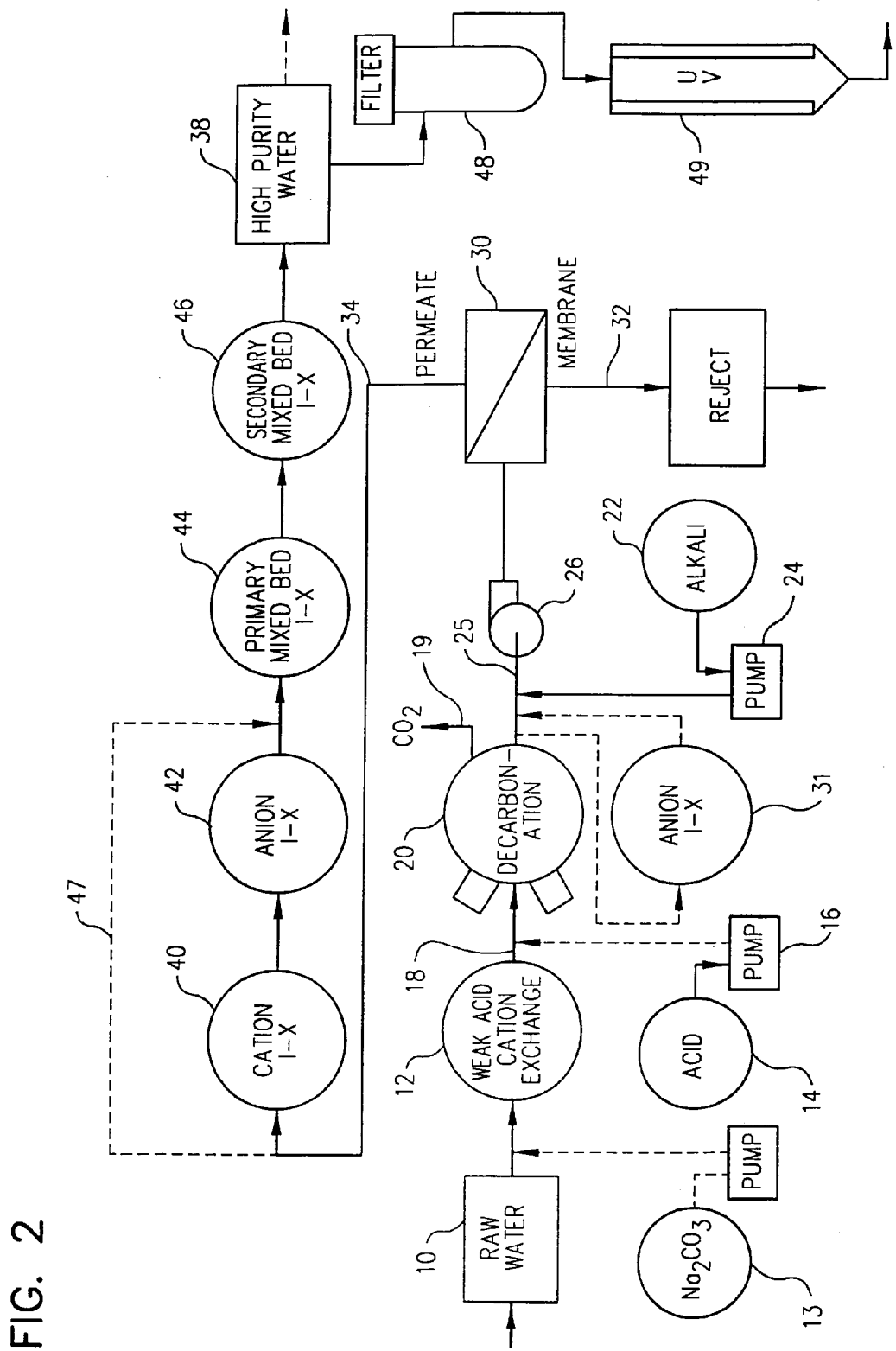
FIG. 2 illustrates a first embodiment of my method for high efficiency reverse osmosis operation, showing use of a weak acid cation exchange unit for simultaneous hardness and non-hydroxide alkalinity removal.

The selection of specific operations and control points to fulfill the above process condition requirements is influenced by the characteristics of each specific feedwater. The percent recovery needed (or desired for a specific application) also affects the operations and control point criteria as well. FIG. 2 represents a highly cost effective RO unit process sequence.

The first step is to adjust the hardness-to-alkalinity ratio of the feedwater, if needed. Optimizing this ratio, which is typically done by alkali addition, makes complete hardness removal feasible in the next process step.

The second step in the RO process train involves the utilization of a weak acid cation (WAC) resin (e.g. DOWEX® MAC-3, or Lewatit CNP-80, Amberlite® IRC-86). Operated in hydrogen form, the WAC resin removes hardness quantitatively, given the proper hardness-to-alkalinity ratio of the influent. The hydrogen ions liberated in the cation exchange process react with the alkalinity and produce carbonic acid $(H_2CO_3)_2$, which is dissolved in the WAC effluent.

The third step involves adding acid to the WAC effluent to destroy the remaining alkalinity, if any such alkalinity is present. Total alkalinity removal at this step is important in order to achieve very high recovery across the RO system.

In a fourth step, the acidified effluent, containing virtually zero hardness and alkalinity, is then treated for carbon dioxide removal. This removal can be accomplished in a forced/induced draft decarbonator or in an existing vacuum degasifier of either packed bed or gas permeable membrane barrier design. The decarbonated, essentially zero hardness, essentially zero alkalinity water, is then injected with a soluble alkali, preferably for adjusting pH to 10.0 or higher, and most preferably to the pH as needed to achieve pH up to at or near 11.0 in the RO reject.

The next step consists of operating the RO system in such a manner that the pH of the reject is approximately, but preferably not appreciably higher than, 11.0. Note that this pH 11 limitation is applicable simply with respect to currently available RO membranes. An exemplary membrane, with the highest pH tolerance capability, is a FILMTEC type FT30 membrane. If RO membranes with a higher pH tolerance capability become available in the future, then the maximum allowable RO reject pH can be raised accordingly, with concomitant benefits from the higher pH, in excess of 11.0.

Feedwaters utilized for production of high purity water, as well as those encountered in wastewater treatment, include the presence of silicon dioxide (also known as silica or $SiO_2$) in one form or another, depending upon pH and the other species present in the water. For membrane separation systems, and in particular for RO type membrane separation systems, scaling of the membrane due to silica is to be religiously avoided. This is because (a) silica forms relatively hard scale that reduces productivity of the membrane, (b) is usually rather difficult to remove, (c) the scale removal-process produces undesirable quantities of spent cleaning chemicals, and (d) cleaning cycles result in undesirable and unproductive off-line periods for the equipment. Therefore, regardless of the level of silica in the incoming raw feedwater, operation of conventional membrane separation processes generally involves concentration of $SiO_2$ in the high total dissolved solids ("TDS") stream to a level not appreciably in excess of 150 ppm of $SiO_2$ (as $SiO_2$). Typically, RO systems are operated at lowered recovery rates, where necessary, to prevent silica concentration in the reject stream from exceeding roughly 150 ppm.

Scaling due to various scale forming compounds, such as calcium sulfate, calcium carbonate, and the like, can be predicted by those of ordinary skill in the art and to whom this specification is directed, by use of the Langlier Saturation Index, as discussed above, or other available solubility data. Operating parameters, including temperature, pH, permeate and reject flow rates, must be properly accounted for, as well as the various species of ions in the raw feedwater, and those species added during pretreatment.

I have found that by reliable hardness and non-hydroxide alkalinity removal, to levels which effectively avoid formation of scale at a selected pH for RO operation, the concentration of $SiO_2$ in the RO reject stream can be safely increased to 450 ppm or more. This is accomplished by increasing the pH of the feedwater to the RO system, and without use of scale-inhibition chemicals. Moreover, even with this increase of silica in the RO reject, the level of silica contamination in the RO permeate is preferentially and substantially decreased, when compared to the silica which might be anticipated under conventional RO process conditions.

It is commonly understood that the solubility of silica increases with increasing pH, and that silica is quite soluble in high pH aqueous solution. Along with solubility, the degree of ionization of silica also increases with increasing pH. While the increase in silica solubility is not directly proportional to the degree of ionization, the rate of increase in silica solubility is basically proportional to the rate of change in ionization. This discrepancy between solubility and ionization is explained by the fact that even undissociated silica exhibits some solubility in aqueous solutions, typically up to about one hundred twenty (120) ppm to one hundred sixty (160) ppm, depending upon temperature and other factors. In comparison, silica solubility at pH 11 is in excess of one thousand five hundred (1,500) ppm at ambient temperature; silica is increasingly soluble as temperature and/or pH increases.

Silica is very weakly ionized when in neutral or near neutral aqueous solutions and is generally considered to exist as undissociated (meta/ortho-) silicic acid ($H_4SiO_4$) in most naturally occurring waters with a pH of up to about 8. The dissociation constant (pKa) value for the first stage of dissociation of silica has been reported at approximately 9.7, which indicates that silica is approximately fifty percent (50%) ionized at a pH of 9.7; the other fifty percent (50%) remains as undissociated (ortho) silicic acid at that pH. A graphical representation of the relationship between pH and the percent silica ionization is shown in FIG. 1. Clearly, it would be advantageous, where silica ionization is desired, to operate at a pH in excess of 10, and more preferably, in excess of 11, and yet more preferably, in excess of 12.

The understanding of silica ionization phenomenon is important since the rejection of most species across the membranes of membrane separation equipment is enhanced by increased ionization. Consequently, silica rejection by an RO membrane can be expected to improve as the degree of ionization increases; with respect to silica, ionization increases at higher pH. Therefore, increasing the pH of the RO operation thus provides major benefits. First, silica solubility can be radically increased, even while remaining within the current pH limitations of existing commercial thin film composite type RO membranes. Second, silica rejection is increased significantly at high pH levels, corresponding to the increased degree of ionization of the silica.

To gain maximum benefit from silica ionization at high pH, the RO system should be operated at a pH as high as possible, given the limitations imposed by membrane chemistry and by the membrane manufacturer's warranty. Preferably, the RO system is operated at a pH of about 10 or above, and more preferably, at 10.5 or above, and most preferably, at a pH of 11 or higher. This contrasts with typical RO operation practice, where operating pH has been limited to about 8.5, in order to avoid scale formation, particularly silica and carbonate scales.

Referring again to FIG. 2, one embodiment of my process for membrane separation equipment operation is shown. In this method, raw water 10 is first treated in a weak acid cation ion exchange unit 12, where hardness and bicarbonate alkalinity are simultaneously removed. For those cases where raw water 10 hardness is greater than alkalinity, operation of the weak acid cation ion exchange unit 12 must be facilitated by addition of a source of alkalinity 13, such as by addition of an aqueous solution of sodium carbonate ($Na_2CO_3$). Preferably, the WAC unit 12 is operated in the hydrogen form for ease of operation and regeneration. However, it would also work in the sodium form, followed by acid addition. In any case, in the just mentioned case and otherwise optionally where appropriate, acid 14 is added by pump 16 to the effluent 18 from the WAC unit(s) 12 to enhance bicarbonate destruction. Then, the carbon dioxide 19 which has been created in the WAC (and/or by acid addition) is removed, preferably in an atmospheric pressure or vacuum degassifier 20. Finally, an alkali 22 (base) is added, preferably by pumped 24 injection of liquid solution, to increase the pH of the feedwater 25 to a selected level. Any of a variety of conveniently available and cost effective base products may be used, provided that no appreciable scaling tendency is introduced. Besides use of common sodium hydroxide, other chemicals such as sodium carbonate, potassium hydroxide, or potassium carbonate might be selected. In fact, in certain cases, an organic base, such as a pyridine type compound, may be used effectively to carry out this process. In any event, pressurization of feedwater 25 for the membrane process is accomplished by high pressure pump 26 before transfer to the RO type membrane separation unit 30 as shown. Alternately, alkali (base) addition to the feedwater may be accomplished by passing the feedwater through an anion ion-exchange unit 31 to increase the pH to a desired level. The pH of the feedwater is raised to a selected pH of at least about 8.5 or 9.0, or up to about 10, or preferably (with currently available thin film composite type membranes) to a range between 10 and 11, or otherwise in excess of 11, and more preferably to 12 or more, and most preferably, to 13 or more. With currently available thin film composite type RO membranes, such as those sold by DOW CHEMICAL of Midland, Mich. under their FILMTECH brand by their FILMTEC, INC. subsidiary, controlling the pH to about 10.5 provides most of the benefits of this method without compromise of long-term membrane life. However, to increase silica solubility, and silica rejection, membranes allowing the pH to be raised to at least about 11, or more preferably to at least about 12, or most preferably, to at least about 13, would be desirable. Thus, it can be appreciated that my method may be used to even further advantage when membranes with long life expectancy at such elevated pH's become commercially available.

Reject 32 from membrane separation unit 30 may be sewered or sent to further treatment, as appropriate in particular site circumstances. Permeate 34 from membrane separation unit 30 may utilized "as is" or may be further purified to remove residual contamination, for example, for high purity water users such as semiconductor manufacturing, where 18.2 meg ohm purity water is desired. A conventional post-RO treatment train for production of high purity water 38 in the semiconductor industry includes a cation exchanger 40, followed by an anion exchanger 42, with primary 44 and secondary 46 mixed bed polisher ion exchange units. Somewhat different post RO treatment trains may be utilized to meet the particularized needs of a given site, raw water chemistry, and end use, without departing from the advantages and benefits which may be gained by the RO process method disclosed herein. For example, it may be desirable in some circumstances to omit the cation 40 and anion 42 ion-exchangers, and bypass the RO permeate via line 47 to directly reach the primary mixed bed 44 and polish mixed bed 46 ion-exchange units. Finally, in many ultrapure water plants, the product from the polishing mixed bed ion-exchange units 46 is currently further treated in final filtration units 48 and ultraviolet irradiation units 49 to eliminate particulates and biofouling, respectively. Additional treatment operations may added as appropriate to meet the needs of a particular end user.

Another distinct and unique advantage of my method of RO system operation is that it may be possible, under various raw feedwater chemistry and operating conditions, to operate the entire post-RO ion exchange train (i.e., ion-exchange, units 40, 42, 44, and 46) without regeneration. Depending upon chemistry, it may be possible to simply replace the cation 40 and anion 42 exchangers. In the more usual case, the secondary or polishing mixed bed unit 46 may be replaced with new resin, and the old polishing resin moved to the primary bed 44 position. This is possible, particularly in ultrapure and boiler feed type water treatment systems, because the polishing mixed bed unit 46 is controlled by ending operation when the silica, boron, or other ion leakage reaches a predetermined value. When the predetermined ion leakage value is reached, the then polishing mixed bed unit 46 is substituted for, and placed into the position of, the primary mixed bed ion-exchange unit 44. When the change over of mixed bed ion-exchange units is made, the "old" primary mixed bed unit 44 resin is taken out, and either discarded or sold to other less demanding resin users. New resin is then put into the "old" primary mixed bed ion-exchange unit 44, whereupon it becomes the "new" polishing mixed bed ion exchange unit 46.

Figure 3:
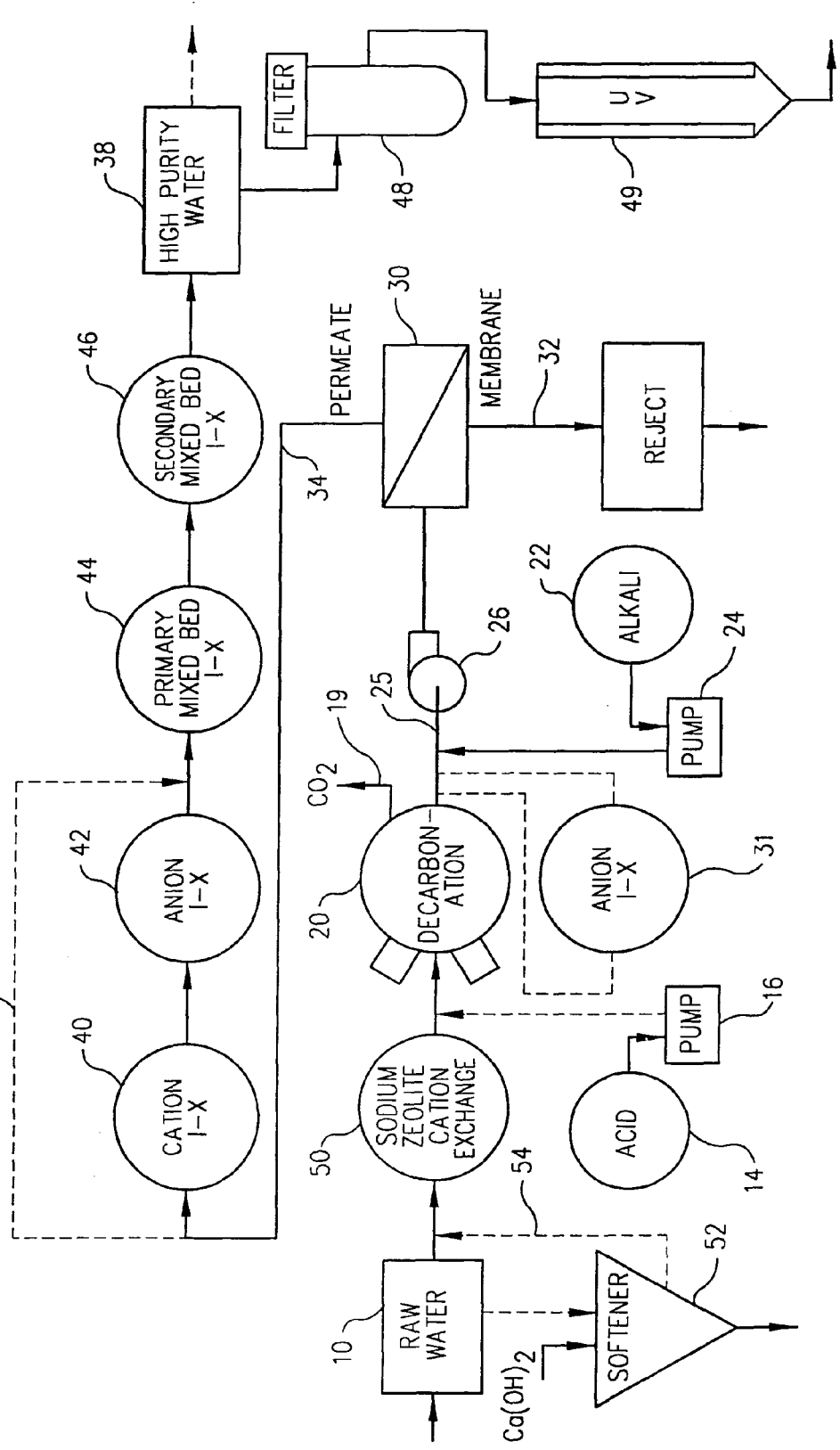
FIG. 3 shows a second embodiment of my method for high efficiency reverse osmosis operation, wherein hardness is reduced by sodium zeolite softening and optional lime or lime/soda softening.

In other embodiments, and as suited to meet the particularized needs of a selected raw feedwater chemistry, various forms of hardness removal may be utilized, including sodium form strong acid cation exchange 50, followed by acidification (see FIG. 3) or even the use of a lime 52 (or similar lime/soda) softener as an additional pretreatment step to either sodium form strong acid cation exchange 50 or weak acid cation exchange 12 (see FIGS. 2 and 3).

Figure 4:
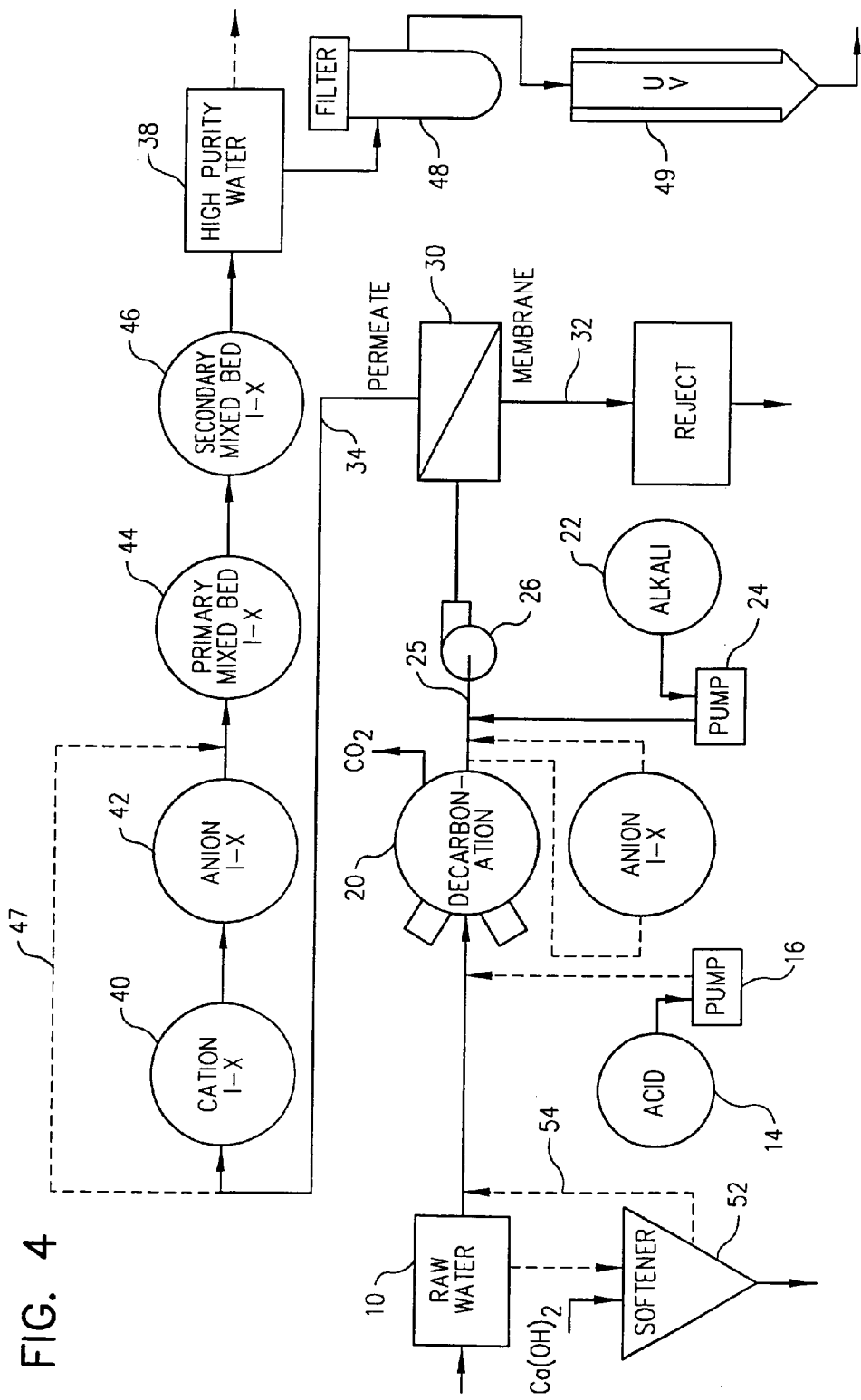
FIG. 4 shows a third embodiment of my method for high efficiency reverse osmosis operation, showing the equipment configuration where alkalinity in raw feedwater can be efficiently and adequately reduced by acid addition, and where hardness may optionally be reduced by lime or lime/soda softening.

For particularly soft waters, the lime or lime/soda softener 52 may be totally inappropriate, and this method may proceed with no softening of the raw water, and only a simple acid 14 feed before decarbonization, as can be seen in FIG. 4. On the other hand, where softening is appropriate, some raw feedwaters can be appropriately treated for reductions in hardness and alkalinity to a desired extend by softener 52. Regardless of the equipment configuration selected for treatment of a particular raw water chemistry, the key process parameters are (a) to remove those cations which, in combination with other species present at high pH, would tend to precipitate sparingly soluble salts on the membrane surfaces, and (b) eliminate non-hydroxide alkalinity to the maximum extent feasible, to further protect against precipitation of scales on the membrane surfaces.

The weak acid cation ("WAC") ion-exchange resins used in the first step of the preferred embodiment of my method, as illustrated in FIG. 2, are quite efficient in the removal of hardness associated with alkalinity. Such a reaction proceeds as follows:

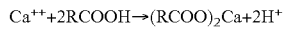
$$Ca^{++} + 2RCOOH \rightarrow (RCOO)_2Ca + 2H^+$$

Then, the hydrogen combines with the bicarbonate to form carbonic acid, which when depressurized, forms water and carbon dioxide, as follows:

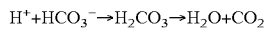
$$H^+ + HCO_3^- \rightarrow H_2CO_3 \rightarrow H_2O + CO_2$$

Regeneration of the resin is accomplished by use of conveniently available and cost effective acid. It is well known by those in the art that regeneration of WAC ion-exchange resins may proceed quite efficiently, at near stoichiometric levels (generally, not more than about one hundred and twenty percent (120%) of ideal levels). Preferably, hydrochloric acid may be used, since in such cases highly soluble calcium chloride would be produced, and the regeneration process would not pose the potential danger of formation of insoluble sulfate precipitates, such as calcium sulfate, even with high strength acids. However, by use of a staged regeneration procedures, i.e., by using a low concentration acid followed by a higher concentration acid, it is possible to reliably utilize other acids, including sulfuric acid ($H_2SO_4$), while still avoiding undesirable precipitates on the resin. In this manner, hardness ions are solubilized to form soluble salts, which are eluted from the resin bed and are typically sewered. Use of sulfuric acid is particularly advantageous in semiconductor manufacturing operations, since such plants typically use large quantities of such acid, and waste or spent acid may be advantageously utilized for regeneration of a weak acid cation exchange bed.

Other polyvalent cations, most commonly iron ($Fe^{++}/Fe^{+++}$), magnesium ($Mg^{++}$), barium ($Ba^{++}$), strontium ($Sr^{++}$), aluminum ($Al^{+++}$), and manganese ($Mn^{++}/Mn^{++++}$), are also removed by the WAC resin. Since the presence of even very small quantities of hardness or other species of decreasing solubility at increasing pH will result in precipitation of sparingly soluble salts under the process conditions present in my process, care must be taken to prevent precipitation on the membrane of the substances such as of calcium carbonate, calcium hydroxide, magnesium hydroxide, and magnesium silicate. One precaution that should be observed is that both hardness and non-hydroxide forms of alkalinity should be aggressively reduced in the feedwater, prior to upward pH adjustment to selected RO operating conditions. Once hardness and non-hydroxide forms of alkalinity have been removed, then the desired pH increase may be accomplished with any convenient alkali source, such as sodium or potassium alkali, or by anion exchange. Once this pretreatment has been thoroughly accomplished, then an RO system can be safely operated at very high pH levels, in order to take advantage of the aforementioned silica solubility.

In cases where raw water composition is such that sodium zeolite softening is advantageous, as is depicted in FIG. 3, elimination of calcium hardness proceeds as follows:

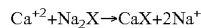
$$Ca^{+2} + Na_2X \rightarrow CaX + 2Na^+$$

Then, bicarbonate alkalinity is converted to carbon dioxide, with a selected acid, in a manner similar to the following:

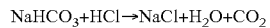
$$NaHCO_3 + HCl \rightarrow NaCl + H_2O + CO_2$$

For those waters where lime softening may be an acceptable or preferred method for initial hardness and alkalinity reduction, the addition of lime to the water reduces calcium and magnesium hardness, and associated bicarbonate alkalinity, as follows:

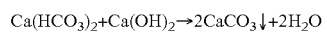
$$Ca(HCO_3)_2 + Ca(OH)_2 \rightarrow 2CaCO_3\downarrow + 2H_2O$$

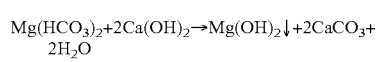
$$Mg(HCO_3)_2 + 2Ca(OH)_2 \rightarrow Mg(OH)_2\downarrow + 2CaCO_3 + 2H_2O$$

This process configuration is depicted as an alternate embodiment of my method, as illustrated in FIGS. 3 and 4. In the cases where lime or lime/soda softening is used, however, extreme care must be used in evaluating the performance of the remainder of the pro-treatment system, since the solubility of hardness ions remains appreciable in the softener 52 effluent stream 54.

For most feedwaters, particularly where lime or lime/soda softening is not employed, the use of a carbon dioxide removal step significantly enhances cost-effectiveness of the process when carried out prior to the pH increase. This also helps to maintain a lower total alkalinity level in the feed to the RO, thus providing a greater margin of safety against scaling due to hardness leakage from the cation removal step. Dealkalization by carbon dioxide removal also helps to enhance silica rejection, due to the lack of competing species. This is because the rejection of one weakly ionized anion is affected by the presence and concentration of other weakly ionized anions in the feedwater; this applies to weakly ionized anions such as boron, organic acids (TOC), cyanide, fluoride, and certain arsenic and selenium compounds.

Since the high pH operation also increases ionization of other weakly ionized anions, including borate, organic acids (TOC), cyanide, fluoride, and certain arsenic and selenium compounds, their rejection rates are enhanced in an RO membrane system. Consequently, in general, my method may be advantageously applied to reject across the membrane most weak acids with a $pKa_1$ of about 7.5 or higher. Silica rejection can be increased to about 99.95%, or more, from a conventional baseline of about 99% rejection; this amounts to at least one order of magnitude decrease in the amount of silica escaping into the permeate, thus providing a ten plus ($10^+$) fold increase in running life for the silica scavenging ion-exchange resin bed, namely anion exchanger 42 and the mixed bed units.

In the case of cyanide, rejections in a first pass RO of in excess of ninety percent (90%) can be attained, in contrast with a more typical range of about fifty percent (50%) or so with conventional RO processes.

Similar to the case for silica, boron rejection can be increased, from a conventional baseline from a range of about 60-70% to 99% and higher, by operation at a suitably high pH. The beneficial effects on rejection percentage due to higher pH operation start at a slightly lower pH in the case of boron, since the pKa for boron is 9.14, roughly one-half pH unit higher than that for orthosilic acid, namely 9.7. The beneficial effects of high pH operation are much more pronounced in the case of boron, however, because orthosilic acid ($H_2SiO_4$) in aqueous solution typically includes six molecules of water of hydration, whereas boric acid ($H_3BO_3$) typically has no attached hydrating water molecules. Thus, the orthosilic acid molecule is very large with respect to membrane pore size as compared to boric acid, no matter what the pH, and as a result, silica has much higher normal rejection rates. Consequently, the increased ionization of boric acid when operating at a pH in excess of about 9.1 is extremely beneficial, and increasingly so as pH rises to between 10 and 11, or the currently preferred control point of approximately 10.5. The boron rejection effect would be even further enhanced when operating an RO system at a pH of 12 or even 13, when commercial membranes become available for such practice.

Example

Pilot Test

Figure 6:
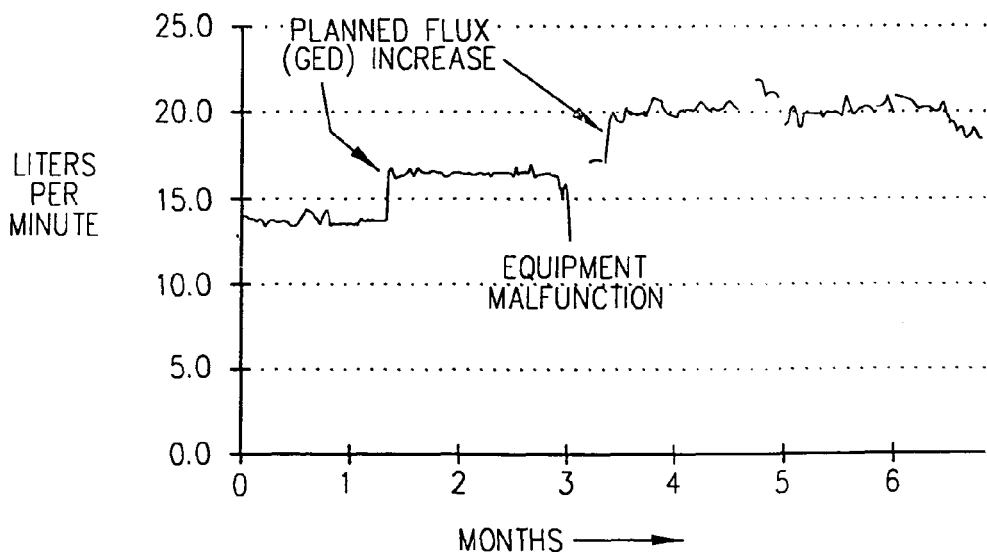
FIG. 6 illustrates the normalized permeate flow, in liters per minute versus time, for a reverse osmosis membrane employed in pilot reverse osmosis test equipment utilizing my novel process.

A pilot water treatment system was set up to test the efficacy of the method disclosed disclosed. The pilot water treatment system was designed for treating an incoming raw city water supply to provide high purity product water for potential future use in a semiconductor manufacturing plant. The objectives were (a) to increase recovery, so as to minimize water usage, (b) to increase the purity of treated water, and (c) to increase the average time between membrane cleanings. The pilot system performed a series of tests. In each of the tests, the system was started up with 450 ppm or higher silica level in the RO reject. The pilot plant system was operated continuously until either (a) a ten percent (10%) decline in normalized RO permeate water flow was experienced, or (b) a fifteen percent (15%) increase in axial differential pressure across the RO membrane was reached. The pilot test was performed with a membrane separation unit including a Dow/Filmtec RO Membrane Model FT30/BW4040, which was operated at pressures from about 130 psig to about 185 psig, with feedwater temperatures ranging from about 20° C. to about 25° C., and at feedwater rates of up to about 8 US gallons per minute (30 liters per minute) maximum. As seen in FIG. 6, long term normalized permeate flows of slightly more than 5 US gallons per minute (about 20 liters per minute) were tested. The pilot test apparatus included a pair of weak acid cation ion exchange beds operated in parallel, utilizing Rohm and Haas Company (Philadelphia, Pa.) weak acid cation resin product number IRC-86, followed by a forced air decarbonator, sodium hydroxide injection, separation of the treated feedwater by the RO membrane into a reject stream and a permeate stream.

Table 1 presents the chemical analyses of from the pilot plant operation for raw water, RO reject, and RO permeate. The Table 1 also shows the rejection rates achieved in the pilot RO operation, and compares those rates with those achieved with a conventional RO system operating on the same feedwater. In particular, note the level of silica in the raw feedwater (67 ppm) and in the RO reject (480 ppm). The silica concentration in the RO reject is roughly three times that normally achievable in reject water from conventional RO process configurations. Moreover, even at the high concentration of silica in the RO reject, improved rejection of silica is seen, in that silica rejection of 99.87% was achieved, compared with rejections ranging from about 95% up to about 99% with a conventional RO system on the same feedwater.

In fact, improved rejection rates were experienced with all important chemical species over the rejection rates experienced with conventional RO, as is clear from the data presented in Table 1.

TABLE 1

PILOT TEST ANALYTICAL RESULTS

| | Raw Feed (ppm) | Pilot RO Reject (ppm) | Pilot RO permeate (ppm) | Pilot RO Rejection (%) | Conventional RO Rejection (%) |
|---|---|---|---|---|---|
| Sodium | 29.9 | 460 | 0 955 | 99.73 | 95-98 |
| Potassium | 6.4 | 18.7 | <0.003 | 99.98+ | 90-95 |
| Calcium | 34 | <0.1 | <0.003 | — | |
| Magnesium | 5.3 | <0.1 | <0.0001 | — | |
| Chloride | 12.1 | 78.1 | <0.004 | 99.99+ | 97-98 |
| Nitrate | 0.74 | 9.42 | 0.003 | 99.96 | 90-95 |
| Sulfate | 46.1 | 278.4 | <0.001 | 99.99+ | 99-91 |
| Boron | 0.083 | 0.62 | 0.007 | 98.51 | 60-70 |

TABLE 1-continued

PILOT TEST ANALYTICAL RESULTS

|  | Raw Feed (ppm) | Pilot RO Reject (ppm) | Pilot RO permeate (ppm) | Pilot RO Rejection (%) | Conventional RO Rejection (%) |
|---|---|---|---|---|---|
| (Dissolved) Silica | 67 | 480 | 0.46 | 99.87 | 95-99 |
| TOC | 0.64 | 1.1 | <0.003 | 99.66+ | 90-95 |
| pH | 8.0 | 10.8 | 10.3 | — | — |

Concentrations in ppm as ion, unless otherwise noted.

TABLE 2

Sodium Ion Exchange Effects

|  | Sodium, ppb | |
|---|---|---|
|  | Conventional RO | New Process |
| RO Permeate | 193 | 955 |
| Post Cation IX | 0.431 | <0.007 |

TABLE 3

POST MIXED BED ION EXCHANGE RESULTS

| Constituent | Conventional RO | New Process |
|---|---|---|
| Boron | Non-detectable | Non-detectable |
| Silica | 0.43 ppb | 0.35 ppb |
| TOC | 5.9 ppb | <3.0 ppb |

Specifically, the high rejection rates of boron and TOC also provide significant additional benefit in reducing loading of downstream anion 42 and mixed bed ion exchange units 44 and 46. In this regard, note that a rejection of 98.51% was achieved for boron, compared with about 60% to 70% which is achievable in conventional RO systems on the same feedwater. Typically, termination of an anion or mixed bed exchange run is determined by silica, or in certain cases, boron leakage. In spite of higher recovery in the pilot RO system, silica content in the conventional RO system permeate was three times higher than in the pilot RO system. Specifically, silica concentrations of 0.45 ppm $SiO_2$ were achieved in permeate from the pilot test unit of this method, compared to 1.5 ppm $SiO_2$ in conventional RO permeate. Clearly, levels of less than 1.0 ppm $SiO_2$ are achievable in RO permeate when utilizing the present method, and in fact, levels of less than 0.5 ppm $SiO_2$ have been shown achievable. Also, the boron content in permeate from my novel process was 0.007 ppm B, versus 0.06 ppm B for permeate from a conventional RO system. Clearly, boron levels of less than 0.05 ppm were demonstrated, as well as levels of less than 0.01 ppm of boron. The test results from Table 1 also shown this result, in that rejection of boron in a conventional RO system ranges from about sixty percent to seventy percent (60%-70%), whereas rejection of boron in my water treatment process was shown to be about ninety eight and one-half percent (98.5%). In other words, in a conventional RO process roughly thirty to forty (30 to 40) borate ions pass through the membrane for each one-hundred (100) present in the -feedwater, whereas in my process less than two, and specifically, only about one and one-half (1.5) borate ions pass through the membrane out of every one-hundred (100) present. In other words, 30 per 100 or 40 per 100 borate ions in the feedwater reach the permeate in conventional RO, versus 1.5 per 100 in this process. In certain feedwaters this number would decrease even further, to as low as $\frac{1}{100}$, or $\frac{1}{1000}$, for boron rejection rates of ninety nine percent (99%) or ninety nine point nine percent, (99.9%), respectively. Thus, this indicates that the run times on anion exchanger 42, while not necessarily proportionate to the influent silica and boron levels, are nevertheless going to be significantly longer when treating permeate 34 from my new process, as compared to run times when treating permeate from a conventional RO system. Since anion exhaustion is indicated by a predetermined level of leakage of silica ($SiO_2$), and, in some cases boron, and since the resin bed outlet concentration is related to the mean species concentration in the resin bed, by achieving significant reduction in the concentration of such anions in the influent to the anion ion-exchange resin bed, the consequence is that longer run times are attained before the maximum allowable leakage of $SiO_2$ or boron is reached.

Importantly, the levels of boron, and particularly silica and TOC were found to be extremely low after treatment of the permeate 34 in the mixed bed ion exchangers 44 and 46 in the pilot plant. A comparison with post mixed bed permeate from a conventional RO process is provided with the data in TABLE 3. Significantly, in my new process, in post mixed bed ion-exchange treated water, the TOC level was found to be less than 3.0 ppb, i.e., below detection limit.

And, not to be overlooked, are the significantly improved rejection of sodium and potassium, which improved to 99.73% and 99.98%, respectively, from conventional RO system rejection rates ranging from ninety five to ninety eight percent (95%-98%) in the case of sodium, and from about ninety to ninety five percent (90%-95%), in the case of potassium.

The significantly higher rejection of strongly ionized species such as sodium, potassium, chloride, and sulfate, compared to conventional RO operations as evidenced by the data in Table 1, was a particularly important and an unexpected experimental result of pilot testing. Further, even though the RO permeate in the pilot plant testing contained a higher level of sodium than does the permeate of a conventional RO process, as noted in TABLE 2, the impact of the higher sodium content on post RO cation exchange is relatively inconsequential. Since the RO permeate from my novel process is highly alkaline (a typical pH of 10.3 during pilot testing is shown in Table 1) and contains significant levels of free hydroxide ions, the sodium removal extent, and capacity of the resin in cation exchange unit 40, is increased by a substantial margin. The effect of the increased hydroxide alkalinity in the permeate to enhance removal of sodium from such permeate is shown in TABLE 2. In conventional RO treatment of the same feedwater, where the RO system permeate has only 193 ppb of sodium, yet the cation ion-exchange resin is only able to effect sodium removal to about 0.431 ppb. In contrast, my novel process, even though 955 ppb of sodium was encountered in the RO permeate, after cation ion-exchange treatment the sodium ion concentration was reduced to less than 0.007 ppb.

The improved rejection of total organic carbon ("TOC") in my process also provides a significant benefit to RO plant operators. It is normal for waters of natural origin to contain detectable quantities of high molecular weight organic acids and their derivatives, particularly humic, fulvic, and tannic acids. These compounds result from decay of vegetative materials, and are usually related to condensation products of phenol-like compounds. Broadly, humic acids include the fraction of humic substances which are soluble in water at alkaline pH, but which precipitate at acidic pH. Fulvic acids include the fraction of humic substances which are water soluble at alkaline and acidic pH. These acids, and their decomposition products, can be carried around in the feedwater stream and form undesirable deposits on selected substrates, particularly anion selective substances. Also, they tend to contribute to fouling in conventional RO systems. Therefore, it is desirable to minimize the effect of such molecules on or through the reverse osmosis membrane, so that adverse consequences of their presence can be avoided, particularly at the anion ion-exchange unit. As can be seen by reference to Table 1, the TOC content of the permeate 34 is substantially lower in comparison to TOC from a conventional RO process with identical TOC in the raw feedwater. Specifically, there is rejection of ninety nine point sixty six percent (99.66%) of TOC in the pilot plant RO system, compared to only ninety to ninety five percent (90 to 95%) recovery in conventional RO systems. As in the cases of silica and boron, increased ionization of TOC at the elevated pH of my new process attributes to this important result. Thus, taking advantage of the ionization range of ionizable organic carbon species enables effective TOC reductions when operating RO systems according to the method set forth herein.

Operational results of the pilot test unit may also be better appreciated by reference to FIGS. 5, 6, 7, and 8. FIG. 5 illustrates the relationship between the axial differential pressure (ΔP) versus time, in kPa (pounds per square inch), for the reverse osmosis membrane employed in the pilot reverse osmosis test equipment. The differential pressure shown has not been corrected for changes in feedwater flowrate. In comparison to conventional RO, the pilot test results show that a stable normalized permeate flow rate, a stable silica rejection rate, and a stable differential pressure have been achieved. This indicates that fouling/scaling have been essentially eliminated in my new process. FIG. 6 shows the normalized permeate flow, in liters per minute, versus time over a six month period, for the reverse osmosis membrane employed in the pilot reverse osmosis test equipment.

Figure 7:
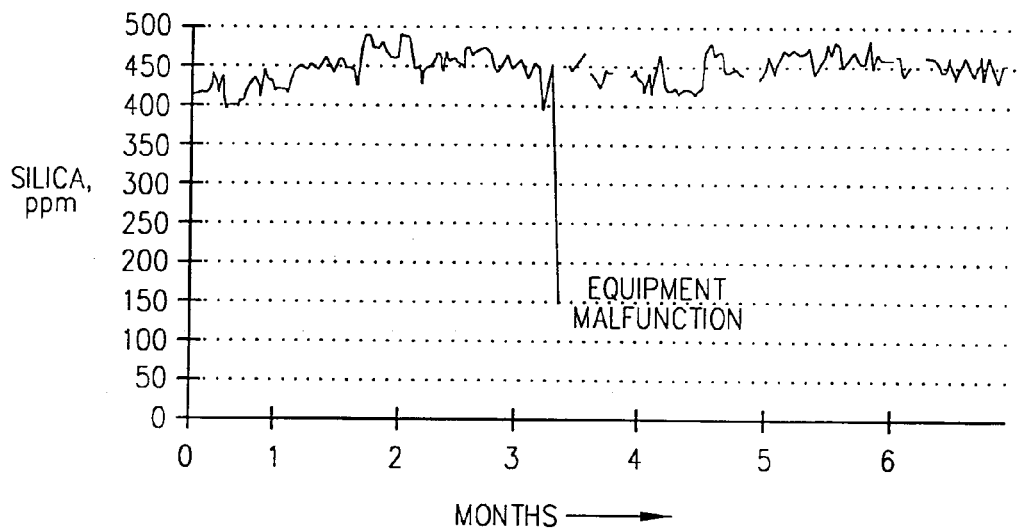
FIG. 7 illustrates the silica concentration in the reverse osmosis reject stream in pilot reverse osmosis test equipment utilizing my novel process.
Figure 8:
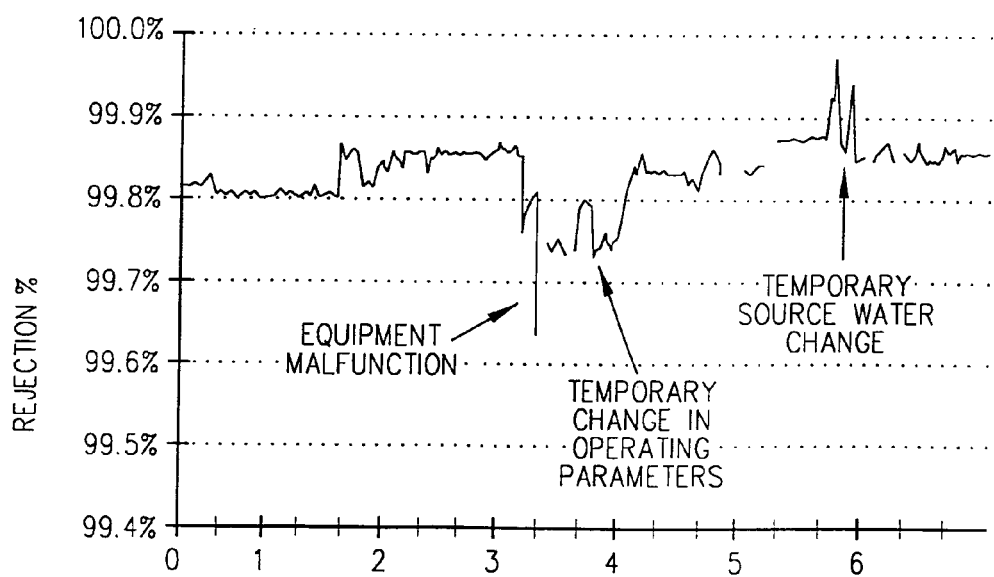
FIG. 8 illustrates the rejection percentage of silica versus time, for a reverse osmosis membrane employed in pilot testing of my novel process.

FIG. 7 illustrates the silica concentration in the reverse osmosis reject stream over a six month period in pilot reverse osmosis test equipment. FIG. 8 illustrates the rejection percentage of silica, versus time over a six month period, for the reverse osmosis membrane employed in pilot reverse osmosis test equipment. This silica rejection is based on an arithmetical mean silica concentration in the pilot RO unit.

After each shutdown of pilot plant operation due to a ten percent (10%) or more decline in normalized permeate flow, the membranes were inspected and cleaned. An important finding was that cleaning can be simply and effectively accomplished by commodity membrane cleaning chemicals, such as hydrochloric acid solutions, tetrasodium EDTA, and sodium hydroxide. Expensive proprietary chemical cleaning agents were not required. An RO membrane operated with feedwater pretreatment in the manner set forth herein was proven to be completely restored to a flux of essentially one hundred percent (100%) of startup performance values. Substantially all of the cleaning was accomplished with the acidic first step of the cleaning process, thus indicating that calcium carbonate, magnesium hydroxide, magnesium silicate, and the like, were the predominant scaling species. Importantly, this revealed that neither silica scaling or biofouling were major concerns under the specified process conditions. The enhanced runnability, or increased system availability, with minimal scaling and virtually non-existent bio-fouling, is clearly another important benefit of my novel RO operational method.

Biological fouling of thin film composite membranes has heretofore tended to be a common problem, and, with certain specific feedwater sources, has been virtually insurmountable. Although it was anticipated that control of biological fouling would be improved due to operation at relatively high pH levels, the degree of biological fouling control actually achieved far exceeded expectations, with bacteria levels being virtually non-detectable during autopsy of RO membrane elements. This means that instead of accumulating living and dead bacteria against the membrane surface, as is common in conventional RO systems, in my unique method, incoming bacteria are killed and dissolved away from the membrane surface. Thus, this method of RO pretreatment and operation may become useful for treating problematic water sources. This is effective because high pH solutions cause disinfection by cell lysing or rupture of the cell wall. This is a quite potent and quick acting method of anti-bacterial activity, when compared, for example, with chlorination which acts by the much slower method of diffusion through the cell wall to cause death by inactivation of the microorganism's enzymes. Also in contrast to chlorine sanitized systems, at the high pH operation preferred in the present method, viruses and endotoxins (lipopolysaccharide fragments derived from cell walls of Gram-negative bacteria) are effectively destroyed by lysis, thus enabling the present method to be employable for the production of pyrogen free or sterile water. In essence, the present method, when operated at a pH in excess of about 10, provides sanitization (3 log reduction in bacteria and destruction of vegetative matter), and may also prove to essentially provide true sterilization (12 log reduction in bacteria and the elimination of biofilm and spores) of the process equipment, as test results showed a zero (0) bacteria count in the permeate. Also, it should be noted that the increased pH of permeate in this method of operation enables similar, helpful results in the post RO treatment equipment. Such a method of operation should be of particular benefit in the production of high purity water for pharmaceutical applications, where the requirements for United States Pharmacopeia 23 ("USP 23") standards, as supplemented, must ultimately be met by the final product water. In this regard, the avoidance of use of raw water polymers, antiscalants, and other proprietary chemicals in RO pretreatment, as described herein with respect to a preferred embodiment, can eliminate undesirable additives to pharmaceutical grade water, and reduce costs by reducing the necessary tests on RO product water. More concisely, the selection of a pH for RO operating conditions which does not support bacteria growth, and carrying out of hardness and alkalinity removal to a level which avoid use of additives, is a superior method for production of high purity water.

A further benefit of high pH operation is with respect increased protection of membranes, particular the thin film composite types, which have limited tolerance for oxidizing agents at neutral, near neutral, and moderate alkaline pH's (up to roughly pH 9). When chlorine is added to RO feedwater, gaseous chlorine ($Cl_2$) or sodium hypochlorite (NaOCl) are typically utilized. Because of membrane sensitivity to free chlorine, in conventional RO systems, it is normally removed by sulfite ($SO_3^-$) injection. However, above pH 9, and particularly above pH 10, the effect of chlorine and other similar oxidants on thin film composite membranes is significantly reduced. This is because the concentration of the non-ionized species (such as HOCl, known as hypochlorous acid) is decreased dramatically, since such acids are relatively weak. Consequently, in my HERO™ high pH reverse osmosis process, typically operating at a pH of 10 or higher, chlorine removal is not generally necessary, thus reducing system complexity and costs. This may be especially beneficial for those systems which utilize a municipal water source as the feedwater to the water treatment plant.

Enhanced membrane life is also another benefit of my novel membrane operation process. In membrane operations, and in particular with respect to RO operations, longer membrane element life may be expected, primarily because scaling and biofouling are avoided, and thus, exposure to harsh cleaning chemicals (for instance, acid chemicals and surfactants) is reduced dramatically.

RO membranes are taken out of service when the rejection of critical species, for example silica, boron, or TOC, falls below an acceptable limit. For silica, this usually occurs when rejection falls to between ninety five and ninety six percent (95%-96%), from an original value of ninety nine percent (99%) or higher. As discussed above, the initial rejection values for silica in my process are significantly higher than are achieved in conventional RO systems. Therefore, if conventional RO limitations for silica rejection were accepted, for example, a specific membrane element would last longer before the acceptable limits were reached. Stated another way, even after a considerable term of service, the membrane elements utilized in the present method will give silica rejections which are in excess of those provided by even new membranes operating in conventional RO process configurations.

High flux, or permeate production, is also achievable due to the unique operating conditions of my method for operating an RO system. Several factors contribute to this result. Flux, expressed as liters of water passed through one square meter of membrane in one day, termed $L/m^2/day$ (gallons of water passed through one square foot of membrane in one day, generally termed "GFD"), is anticipated at about 15 GFD for conventional RO systems. In pilot testing, the noted thin film composite type FILMTEC BW membrane was operated at 977 $L/m^2/day$ (24 GFD), and potential for up to 1222 $L/m^2/day$ (30 GFD) was favorably evaluated. While the latter flux rate is believed to be the approximate current hydraulic limit of conventional RO module design, based on spacer configurations, it is anticipated that even increased flux can be achieved in this method of operation (up to 2036 $L/m^2/day$ (50 GFD or so) when membrane modules become available that can support such increased flux. This is a most advantageous result for RO system operators, since, for example, if the normal flux is doubled by use of this method, then the total square meters (square feet) of membrane surface required is reduced by a factor of two. Corresponding decreases in capital cost (specifically, for membranes and pressure vessels) and floor space requirements are therefore achieved. Operating cost, already significantly lowered by other benefits of the instant method, are further decreased by lowered membrane replacement costs. The one hundred fifty percent (150%) plus flux increase demonstrated in testing over the design basis for conventional RO systems provides an immediate benefit.

When utilizing the present method, osmotic pressure of the RO reject represents the ultimate limitation for RO technology. Once appropriate raw feedwater treatment has effectively removed sparingly soluble species, such as calcium carbonate, calcium sulfate, barium sulfate, silica, etc., then concentration of reject can proceed until the osmotic pressure limitation is reached. At this time, the design pressures for commercially proven RO systems are typically limited to approximately 8280 kPa (1,200 psig). If a design allowance is made for a 200 psig driving force with respect to the reject stream, then the maximum allowable osmotic pressure would be approximately 6900 kPa (1000 psig). For purposes of example, based on a simplified rule of thumb that approximately one (1) psig of osmotic pressure is exerted by one hundred (100) ppm of TDS, the maximum allowable TDS of the reject stream would be approximately 100,000 ppm. Thus, this new RO operating technology, regardless of feedwater chemistry, is potentially capable of concentrating any feedwater to approximately 100,000 ppm without concern with respect to the various sparingly soluble species, and in particular, with respect to calcium sulfate, barium sulfate, and silica.

Yet another advantage of my new RO operating technology is that existing RO systems, when retrofitted with the herein discussed pretreatment equipment for hardness and alkalinity removal, can take advantage of the operating benefits of this process method.

Figure 9:
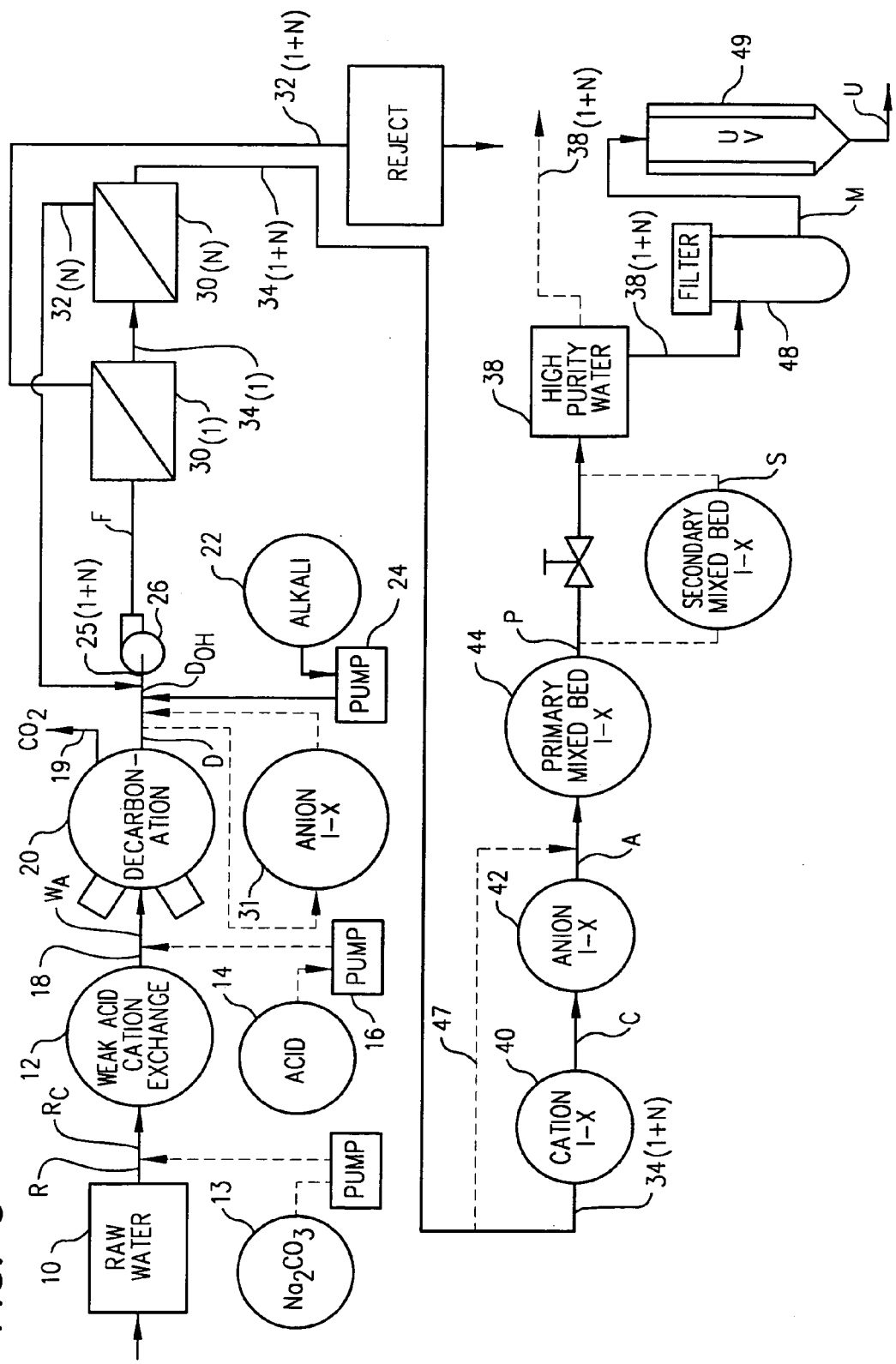
FIG. 9 describes the use of my method of RO system operation when using a multipass RO process to sequentially process a portion of initial feedwater to produce a permeate which has been passed through more than one RO membrane.

Additional applications for this unique RO operating method exist in both high purity applications such as semiconductor manufacturing and pharmaceutical applications, as well as the more traditional industrial uses for boiler feedwater, cooling tower makeup water, and scrubber makeup water. Application of my method of reverse osmosis system operation to high purity water production systems is shown in FIG. 9. In this figure, a multipass reverse osmosis process technique is utilized to sequentially process a portion of initial raw feedwater 10 feedwater to produce a final permeate $34_{(1+N)}$ which has been passed sequentially through a number N of reverse osmosis membrane units, where N is a positive integer, typically two (2) or sometimes three (3), although a higher number could be utilized. As described above the raw feed water 10, if deficient in alkalinity, may have alkalinity added by any convenient technique, such as by sodium carbonate 13, and then that treated stream $R_C$ is sent to the weak acid cation ion-exchange system 12. After cation exchange, acid 14 such as hydrochloric or sulfuric may be added to produce an intermediate treated stream $W_A$. Then, carbon dioxide is stripped in decarbonation unit 20 to produce an intermediate treated stream D. Then, the pH is increased by a convenient and cost effective method such as addition of alkali solution 22 or by anion ion-exchange unit 31, to produce a further intermediate treatment stream $D_{OH}$. Reject $32_{(N)}$ from reverse osmosis unit N (and any intermediate RO units between the first RO unit $30_{(1)}$ and the final RO unit $30_{(N)}$ are then recycled into the feedwater before the RO unit $30_N$, to produce a feedwater $25_{(1+N)}$ containing undesirable but tolerable solute species and solvent water. Pump 26 pressurizes the feedwater $25_{(1+N)}$ to produce a pressurized feed to the first RO unit $30_{(1)}$; after processing, permeate $34_{(1)}$ results, which is then feed to the next reverse osmosis unit the series from 1 to N units. The reject from the entire RO train is shown as reject $32_{(1+N)}$. High purity treated permeate from the entire train is shown as permeate or product water $34_{(1+N)}$, and it is feed to the usual ion-exchange equipment for final cleanup before use. Cation ion-exchange unit 40 produces a further intermediate purity stream C, which is followed by anion ion-exchange unit unit 42 to produce a further intermediate purity stream A. Before use, a primary mixed bed ion-exchange unit 44 produces a yet higher purity stream P, and an optional secondary or polishing mixed bed ion-exchange unit 46 produces a still higher purity, possible final purity product S, or, using the same nomenclature as above, pure product water stream $38_{(1+N)}$. In semiconductor manufacturing, final filtration in sub-micron filters 48, using nominally sized 0.02 micron filters, but perhaps selected from sizes ranging from about 0.02 micron to about 0.1 micron in size, is generally practiced, to produce a still higher product stream M. Also, biological control by passing high purity water through a UV sterilizer unit 49 is customary, normally operating at 254 nm wavelength to kill any bacteria which may remain in the high purity stream M to produce a final ultrapure water U. In many systems, the positions of the final sub-micron filters 48 and the UV sterilizer unit 49 may be reversed, or a further post UV filter may be utilized.

Figure 10:
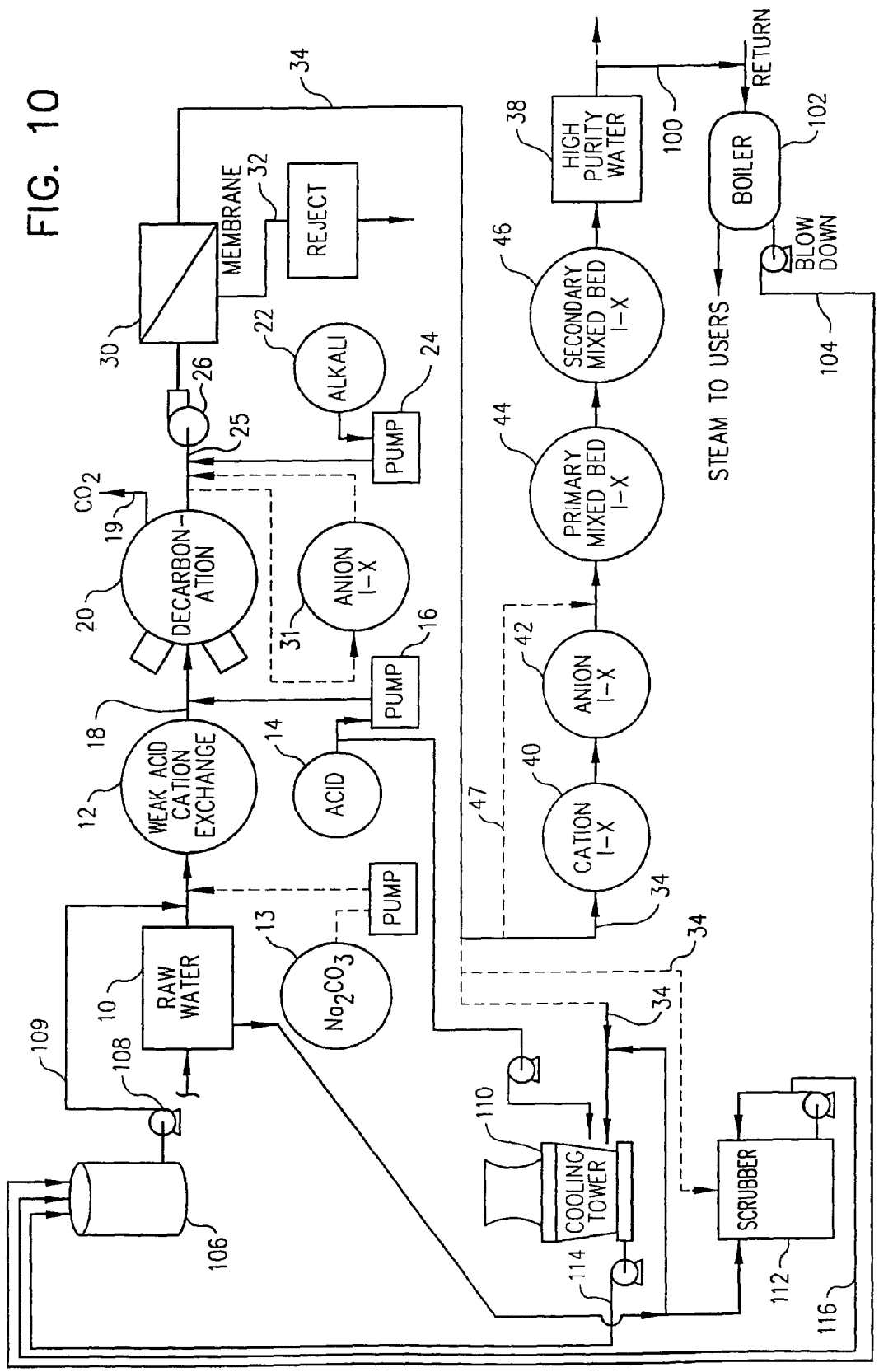
FIG. 10 illustrates the use of my method of RO system operation for boiler feed makeup water, or for cooling tower makeup water, or for scrubber makeup water.

FIG. 10 illustrates the use of my method of reverse osmosis system operation for boiler feed makeup water, or for cooling tower makeup water, or for scrubber makeup water. The reverse osmosis unit 30 and various pretreatment equipment is operated according to the methods set forth hereinabove, to produce a high purity permeate 34. The product water permeate 34 is then treated in an ion-exchange system as necessary based on specific boiler requirements, and fed as makeup water 100 to a boiler 102. Blowdown 104 from boiler 102 is sent to an accumulation tank 106 for pumping 108 through return line 109 to the RO pretreatment train. Although the cooling tower 110 and scrubber 112 could be fed with RO permeate 34, more typically, the cooling tower 110 and scrubber 112, for example in a steam-electric power plant, would be supplied by usual raw water 10 supplies, such as municipal or well water. Therefore, cooling tower blowdown 114 and scrubber blowdown 116 are typically high in both hardness and alkalinity. Likewise, this system may be used to treat water having intimate contact with ash, such as ash pond water or ash sluicing water from coal fired steam-electric power plants. In my reverse osmosis process, a significant amount of reusable water can usually be obtained by my method of RO pretreatment and operation, unlike the case with conventional RO systems.

Figure 11:
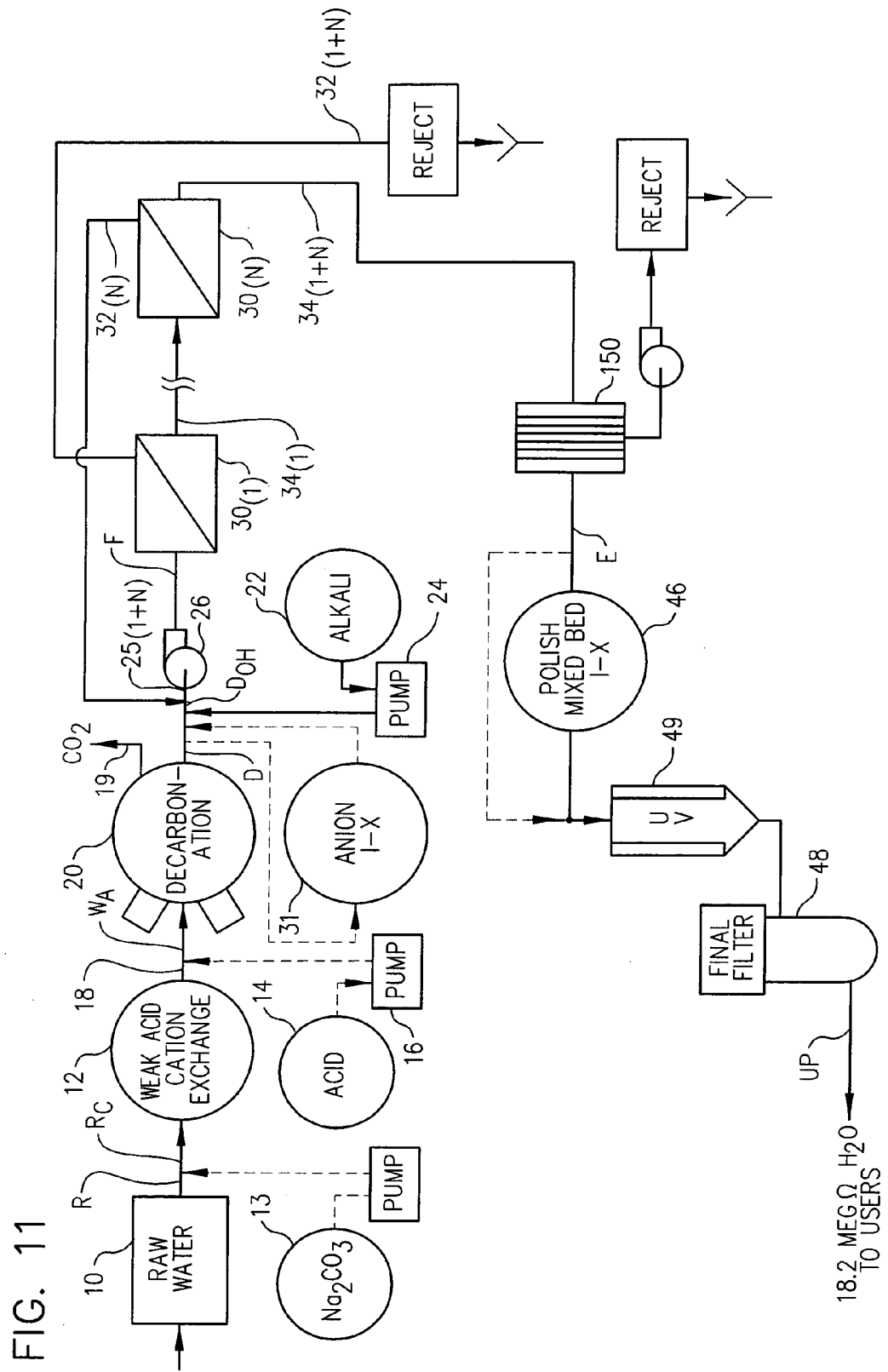
FIG. 11 illustrates the use of my method of RO operation in combination with continuous electrodeionization equipment for high purity water production.
Figure 12:
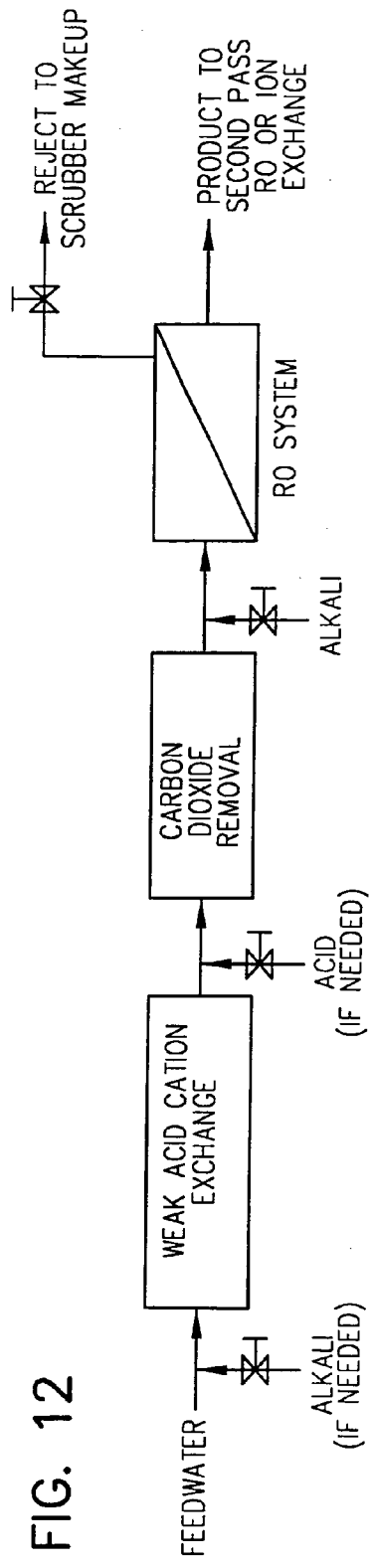
FIG. 12 illustrates a process flow diagram for one configuration of my high efficiency RO process.

Another advantageous use of my method for pretreatment and operation of an RO system is illustrated in FIG. 11, where a preferred embodiment similar to that explained above is shown in use with a multipass RO system (here, two pass with RO units $30_{(1)}$ and $30_{(N)}$, where N=2), in pretreatment for a continuous electrodeionization system 150. RO permeate $34_{(1+N)}$, when treated by continuous electrodeionization, will produce a very high quality deionized water E which, after ultraviolet treatment 46 and final filtration 48, will be of acceptable for use in the microelectronics industry as ultrapure water UP. Optionally, the secondary or polish type mixed bed ion exchange unit 46 may be omitted, and the continuous electrodeionization product water E may be sent directly to the UV sterilizing unit 49. This is true since the limitations of continuous electrodeionization to reject boron, silica, TOC and the like thus limit its ability to produce, as a direct effluent, 18.2 megohm water for electronics manufacturing. Yet, the permeate $34_{(1+N)}$ from the two pass RO system, when operated according to the method disclosed herein, contains very low levels of such species which are troublesome to continuous electrodeionization, such as boron, silica, TOC and the like. Thus, use of such permeate as feed for a continuous electrodeionization treatment unit is believed to enable such electrodeionization units to produce 18.2 megohm water without the benefit of downstream ion-exchange polishers 46. The advantage of using continuous electrodeionization over conventional ion exchange, of course, is that the continuous process (rather than the batch process of ion exchange resins) is regenerated electrically, rather than chemically, and therefore avoids the use of conventional regeneration chemicals.

And, even in wastewaters, the instant method may often be used to advantage. Since an RO system when operated as taught herein will substantially reject ionizable species at high pH, high rejection of such constituents will be achievable to produce an RO permeate low in such constituents, for recycle and reuse. Wastewaters from refineries, pulping and papermaking operations, and municipal sewage treatment plants, all are fairly high in candidate components (aliphatic and or aromatic organic acids and their derivatives), and are most difficult for conventional RO membranes to handle due to organic fouling and related biological growth. Typical industrial uses where water of sufficient quality may be attained when treating wastewaters include cooling towers, boiler makeup, scrubber makeup, and the like.

Benefits of HERO Brand RO Process Design and Operation

Many exemplary and desirable process benefits provided by the HERO brand RO system process design and operation were listed above at pages 22-23. Detailed explanation of such benefits include:

(A) High Rejection of Contaminants

As shown in Table 4, which summarizes data from a HERO brand RO process pilot plant, rejection of all species is significantly higher than what can be achieved in conventional RO operation. Particularly noticeable is the improvement in the rejection of weak anions such as TOC, silica, and boron. Given that humic/fulvic acid derivatives (TOC), silicic acid, and boric acid are all relatively weak acids, at high operating pH these acids will dissociate to a much greater extent (compared to near-neutral pH operation) and, therefore, will be much better rejected by the RO membrane.

The improvement in the rejection of strongly ionized (at near-neutral pH) species was also observed. Several factors are believed to contribute to the improvement in rejection of strongly ionized species. A change of membrane morphology, is believed to occur. A significant reduction in the thickness of the concentration polarization layer adjacent to the membrane surface (due to reduced surface tension at high free causticity conditions) is believed to be a major contributor to this improvement. Also, swelling of elastomers such as o-rings, and the resultant better sealing characteristics in the modules are also a factor.

The impact of much higher rejection of silica, etc., on the behavior/operation of a post-RO ion exchange system is extremely significant. Since the vast majority of post-RO ion exchange is regenerated on the basis of either silica or boron breakthrough, a factor of ten reduction in the influent silica/boron content will provide much longer run times between regenerations. Absence of carbon dioxide, as well as bicarbonate in the RO permeate (due to a high pH, typically at least 10), will also increase on line time before silica/boron leakage exceeds normal threshold values. Reduction of strongly ionized species concentration in the RO permeate is of relatively less significance, since most post-RO ion exchange is ultimately silica or boron limited.

TABLE 4

COMPARISON OF HERO ™ RO VS. CONVENTIONAL RO

| Constituent | Rejection (%) Conventional | Rejection (%) HERO | Passage (%) Conventional | Passage (%) HERO | Passage Factor Conv/HERO | Passage Reduction (%) |
|---|---|---|---|---|---|---|
| Sodium | 98 | 99.73 | 2 | 0.27 | 7.4 | 87 |
| Potassium | 90 | 99.98 | 10 | 0.02 | 500.0 | 99 |
| Chloride | 98 | 99.99 | 2 | 0.01 | 200.0 | 99 |

TABLE 4-continued

COMPARISON OF HERO ™ RO VS. CONVENTIONAL RO

| Constituent | Rejection (%) Conventional | Rejection (%) HERO | Passage (%) Conventional | Passage (%) HERO | Passage Factor Conv/HERO | Passage Reduction (%) |
|---|---|---|---|---|---|---|
| Silica 99 | 99 | 99.87 | 1 | 0.13 | 7.7 | 87 |
| Boron | 70 | 98.51 | 30 | 1.49 | 20.1 | 95 |
| TOC | 95 | 99.66 | 5 | 0.34 | 14.7 | 93 |

TABLE 5

WATER ANALYSIS

| | Raw Water | RO Reject | RO Product |
|---|---|---|---|
| Na + K | 125 | 1,350 | <1 |
| Ca | 7 | 0 | 0 |
| Mg | 13 | 0 | 0 |
| HCO3 | 85 | 50 | <1 |
| CO3 | 0 | 50 | <1 |
| NO3 | 1 | 10 | <1 |
| SO4 | 30.8 | 308 | <1 |
| Cl | 28.2 | 282 | <1 |
| SiO2 | 50 | 500 | <1 |
| pH | 7.1 | 10.8 | 10.2 |

Notes:
1. Analysis of RO feed is not shown in the table, nor is the hydroxide content of RO reject and RO Product.
2. The chemistry is based on 90 percent RO recovery, while maximum recovery feasible is approximately 96 percent.
3. Except for pH, all constituents are reported as mg/l as CaCO$_3$

TABLE 6

COST ESTIMATE OF A RETROFIT

| | | |
|---|---|---|
| Water/Waste Water Savings | 244,000 | (US $/Yr) |
| Antiscalant Elimination | 30,000 | (US $/Yr) |
| Power Savings | 17,000 | (US $/Yr) |
| Additional Chemical Costs | (40,000) | (US $/Yr) |
| Additional Miscellaneous Costs | (20,000) | (US $/Yr) |
| Net Annual Savings | 231,000 | (US $/Yr) |
| Conversion (Capital) Cost | 200,000 | (One Time) |
| Simple Pay-Back Period | 10.4 | (Months) |

TABLE 7

COST COMPARISON

| | Conventional System | HERO System |
|---|---|---|
| Equipment Capital Cost (US $MM) | 12 | 7.8 |
| Operating Cost (US $/1,000 US Gallon) | 5.75 | <4.00 |

Note:
See Section 5.0 for basis.

Compared to 60 to 70 percent boron rejection in conventional thin film composite RO operation, the new process provides approximately 99 percent boron rejection. In a double pass configuration, the new process is capable of producing a permeate with lower than detectable limits of boron content.

Another very significant advantage in operating ion exchange with permeate from a HERO brand RO system is that sodium leakage from cation resin is reduced by several orders of magnitude, due to the high ambient pH of the influent. As a result, longer run times between regeneration for existing ion exchange systems means lower chemical and manpower needs, lower regeneration waste volume, etc. For new systems, or for existing systems undergoing expansion, the new HERO brand RO process design and operation can have a strong positive impact on the ion exchange system capital cost as well.

(B) High Recovery Rates

Since hardness-causing ions such as calcium, magnesium, barium, strontium, aluminum, iron, manganese, etc., have been removed prior to the RO, undesirable precipitation of species such as calcium carbonate, calcium fluoride, calcium sulfate, barium sulfate, magnesium hydroxide, aluminum/magnesium silicate, etc., does not occur in the HERO brand RO process, and thus that type of precipitation no longer limits the recovery achievable by an RO system. Importantly, silica solubility, is increased dramatically at the normal HERO brand RO operating pH (preferably of approximately 11). Sustainable long-term operation with silica levels in the 450 to 500 ppm range (in the RO reject) has been proven, and theoretical models indicate that levels of 1,000 ppm or higher may be achievable in this new RO operational method.

Based on 25 ppm silica in the RO feed, 95 percent recovery RO operation (approximately 500 ppm in the reject) has been proven by testing. Still, 97.5 percent recovery (approximately 1,000 ppm silica in the RO reject) is theoretically feasible, whether or not practical from an operational point of view. Since silica usually represents the ultimate limiting criterion, in terms of maximum allowable recovery in an RO system, increased silica solubility along with essentially total absence of species such as calcium, barium, etc., in RO feed, should allow RO operation at very high recovery rates (90 to 98 percent) with the vast majority of feedwaters.

With feedwater relatively high in barium content, RO system recovery can be limited by barium sulfate precipitation potential at the reject end. The HERO system eliminates this concern altogether, since barium is quantitatively removed prior to the RO. The same outcome is also applicable for RO systems limited (in recovery) by strontium sulfate, calcium sulfate, calcium fluoride, and other sparingly soluble calcium, magnesium, iron, and aluminum salts.

Of course, the final limit in RO recovery, represented by osmotic pressure of the RO reject, will still control the maximum feasible recovery achievable with a specific feedwater, but this limit is not usually reached at recoveries less than 99 percent with most feedwaters.

(C) Biological Fouling is Essentially Eliminated

Most commonly occurring microbial species are completely lysed (physically destroyed) at the high operating pH. In fact, even virus, spores, and endotoxins are either destroyed or rendered incapable of reproduction/proliferation at very high pH levels. Saponification of lipids (fat) is expected to play a role in the process as well since fatty acids and their corresponding glycerides will form soluble "soaps" at the high operating pH.

In one location where long-term tests were carried out, biofouling was conspicuous by its absence during the test of the HERO technology. This pilot RO system exhibited very stable operating performance in terms of normalized permeate flow and system pressure drop throughout the test period. Further confirmation of the absence of biofouling was obtained during autopsy of RO elements at regular intervals. A stage wise program to test and autopsy the FILMTEC FT30 based elements was conducted over a 15 month period. The data showed higher salt rejection than the initial Quality Assurance values under standard test conditions. Also, the membrane surface was clean and free of any evidence of biofouling.

This characteristic of the new process can be of significant benefit for sites with known biofouling problems or for the treatment of bio-contaminated/bio-active wastewater. It can also be very effective for systems with higher-than-ambient temperature RO operation.

(D) Particulate Fouling is Substantially Reduced

It has been known (and practiced) for almost 30 years that softening of RO feedwater destabilizes colloidal solids present in the feedwater and significantly reduces the associated fouling problems. Mandatory softening requirement as pretreatment for hollow fine fiber RO elements in the late 1960s and early 1970s attests to this strategy. In addition, zeta potential is generally reduced between a surface and foulant particles at high pH, thus reducing the likelihood of adhesion. This property is accentuated by the fact that most naturally occurring particles (including bacteria) exhibit negative surface charges. While side-by-side zeta potential determination is yet to be carried out, the new process is expected to significantly reduce, if not eliminate, particulate fouling problems. The reduction of zeta potential further reduces the possibility of particle adhesion to the slightly negatively charged-membrane surface. The in-situ formation of surfactants from bacterial lipids, if present, will further help in reducing particle adhesion to the membrane surface.

This unique characteristic of the new process can be of significant value in the design of an RO system, particularly in the potential to reduce capital cost and operating complexity of treating UPW. In addition to the ability to accept a certain level of particulate foulants, the new process may also minimize the need for multimedia filtration, coagulant/floucculant addition, Diatomaceous Earth filtration, etc., as pretreatment to the RO system.

(E) Significantly Reduction in Chemical Usage

Dechlorination, either by chemical addition or by activated carbon, may very well be unnecessary as well since the level of free (undissociated) hypochlorous acid (HOCL) is extremely low at the very high operating pH.

(F) Elimination of Scale Inhibitor Use

Use of antiscalants or scale inhibitors, while not harmful or incompatible with the new process, can be completely eliminated, as proven by an 18-month test at a semiconductor manufacturing facility.

(G) High Flux Rates

Given the reduced thickness of the concentration polarization layer, as well as the elimination of biofouling and the reduction of particulate adhesion to the membrane surface, it is not surprising that an RO system utilizing the new process can operate at higher flux compared to conventional operation. Compared to a normal design flux of 611 L/m$^2$/day (15 gfd (gallons per square foot per day)), the HERO brand RO system is designed in excess of 611 L/m$^2$/day (15 gfd), and is preferably designed at about 814 L/m$^2$/day (20 gfd), and more preferably up to about 1018 L/m$^2$/day (25 gfd), and, where feasible, in excess of 1018 L/m$^2$/day (25 gfd).

(H) Higher Product Purity

In addition to reduced capital cost for the RO system, the quality of the RO permeate is improved significantly due to the higher design flux. For example, at 25 gfd, the RO permeate will contain 40 percent lower dissolved solids compared to a 611 L/m$^2$/day (15 gfd) design basis. The higher pH operation, in combination with the high product flux, provides the result that the salt flux (which is concentration dependent, rather than pressure dependent) is significantly reduced. The RO system can be expected to be about 20 percent less expensive due to this factor alone (or more than 20 percent less expensive), all other parameters being equal.

(I) Reject Usable as Scrubber Makeup

The reject from the HERO brand RO system, with high pH, low carbonate alkalinity, and virtually no hardness, can be used as makeup to acidic gas scrubbers. Due to concerns about potential silica precipitation if the pH is lowered significantly in the scrubber, the RO reject should be used on a once-through basis, and thus not be evaporation rate limited.

Process Chemistry

As discussed earlier, very high reject pH is one factors which characterize operation of the HERO brand RO system. Extremely high rejection of the weakly ionized anions such as TOC, silica, boron, etc., can be correlated to such characteristics. The following example, based on silica, can be used to explore this relationship.

In naturally occurring waters and at near-neutral pH range (6-8), silica is primarily present as orthosilicic acid ($H_4SiO_4$). Orthosilicic acid, commonly referred to as silicic acid, is one of the weakest acid species present in water. Silicic acid's first dissociation constant (i.e. the dissociation of the first proton from the total of four hydrogens) is approximately $2 \times 10^{-10}$, corresponding to a pKa value of approximately 9.7 at ambient temperature and very low background ionic strength of the solution.

A convenient way of visualizing the relative strength of silicic acid with $pKa_1$ of 9.7 is to state that at pH 9.7, it is fifty percent (50%) percent ionized, i.e. 50 percent of it is present as undissociated orthosilicic acid, while the other 50 percent is dissociated and is present as monovalent silicate ion, the conjugate base of orthosilicic acid. At pH 10.7, when the log of conjugate base to undissociated acid is unity, approximately 91 percent exists as silicate ion, the other 9 percent as undissociated acid. At pH 11.7, the distribution is 99 and 1 percent respectively. Conversely, at pH of 8.7 (when log of ratio is 0.1), approximately 91 percent of the species is present as undissociated acid and 9 percent as the ionized silicate. At a pH of 7.7, approximately 99 percent is present as undissociated silicic acid and 1 percent as the ionized monovalent silicate ion.

Since the majority of naturally occurring feedwaters are at pH 8 or lower, essentially all the silica exists as undissociated silicic acid under these conditions. Other very weak acids, such as boric acid ($H_3BO_3$, with pKa, of approximately 9.2) and hydrocyanic acid (HCN, with pKa of approximately 9.3) exhibit very similar properties, but of course they are both somewhat stronger acids compared to silica.

Rejection characteristics of individual species across the RO membrane is influenced by the size, shape, and charge density of the solute. It is generally recognized that an ionized solute will be rejected must better compared to a solute that exists in an undissociated state, provided that their size and shape are comparable. Rejection of fluoride, for example, is essentially zero at pH less than 3, 30 percent at pH 3.5, 50 percent at pH 4, 75 percent at pH 5, and 98 percent (or more)

at pH 7. Hydrofluoric acid (a weak acid with pKa of 3.2) is the counterpart of the ionized fluoride species and is the primary component at low pH values.

Rejection of silica/silicic acid, however, is a surprisingly high 98 percent at pH 7, where the primary constituent is the undissociated silicic acid and not the ionized silicate species. This discrepancy is at least partially explained by the fact that the actual size of (ortho) silicic acid is much bigger than expected since the molecule incorporates up to six molecules of water of hydration. Thus, the high rejection is due to the size/shape factor, since at pH 7 there is very little ionization (less than 0.2 percent) of silicic acid.

Based on the factors involved, it would appear that silica, when substantially ionized, should have rejection comparable to that of sulfate ($SO_4^=$) ion. The expectation is based on the fact that the sulfate ion also incorporates six waters of hydration and, of course, it is completely ionized at near-neutral pH values. As a matter of record, sulfate rejection of 99.5 to 99.9 is routinely observed in normal RO operation and the silica rejection in the HERO system operating at pH 10.5 to 11.0 range has actually been better than 99.9 percent. In other words, sulfate rejection at pH 7 and silica rejection at pH above 10 are quite comparable. In view of the relative strengths of the corresponding acids and the relative size of the molecules, this effect can be rationalized as well as utilized.

Another aspect of the new process that merits further discussion is the requirement for essentially complete removal of alkalinity prior to pH adjustment (increase) of the RO feed. From an entirely practical point of view, near-zero alkalinity is a necessity since any residual alkalinity will provide a strong buffering effect and substantially increase the quantity of alkali needed to raise the pH to the normal operating range. Over and above the direct cost of increased alkali requirement, the sodium content of the RO permeate will be much higher also, resulting in unnecessarily high post-RO ion exchange load and cost.

From a conceptual point of view, however, the requirement for alkalinity removal is far more urgent but straightforward. The following example, based on calcium carbonate solubility, will be used to quantify the relationship.

Solubility product (Ksp) of calcium carbonate is approximately $8.7 \times 10^{-9}$ square molar at ambient temperature and very low ionic strength. Assuming 90 percent recovery across the RO is the goal, allowable maximum $CaCO_3$ ion product of the RO feed is approximately $8.7 \times 10^{-11}$ square molar. Further assuming 0.1 mg/l of calcium in the softened feedwater, the allowable maximum carbonate content of the RO feed is approximately 2.1 mg/l, all expressed as ions.

At pH 11.0 reject condition, approximately 85 percent of the carbonate(s) species is present as carbonate, the rest exists as bicarbonate. Assuming 5 mg/l of total residual carbon dioxide equivalent prior to pH increase, approximately 5.8 mg/l of carbonate (as ion) will be present in the RO feed. Compared to the maximum allowable 2.1 mg/l of carbonate, the achievable 5.8 mg/l is three times as high.

To ensure scale-free operation at 90 percent recovery, one or more of the following must be achieved—residual calcium content must be less than 0.1 mg/l, or the RO operating conditions must be changed. While calcium carbonate scale inhibitors are known to generally allow a high Ksp, I am not aware of any such formulation which would efficiently and cost effectively allow continuous high pH operation of RO. Important, it should be noted that during the long-term testing of the HERO system, no scale inhibitors were used whatsoever.

Magnesium hydroxide, with a Ksp of approximately $1.2 \times 10^{-11}$ cubic molar, is in some ways even more demanding in terms of allowable residuals, since magnesium tends to leak earlier from the weak acid cation exchanger and, therefore, more care is needed to prevent magnesium hydroxide scale.

Typical Example

The following is an example for a typical application for the HERO system. The feedwater in the Kumamoto area in Southern Japan, high in silica content, was selected for the example. Costs shown are budgetary (+ or −30 percent accuracy). A cost projection is based on the following assumptions:

(1) 5,700 m³/day (1,500,000 USGPD) system nominal capacity;
(2) 75 percent normal recovery rate vs. 90 percent HERO system recovery rate;
(3) UPW quality (chemical) criteria are:
  (a) silica<1 PPB,
  (b) TOC<1 PPB, and
  (c) Oxygen<5 PPB;
(4) Consumable costs:
  (a) Sulfuric acid (93 percent) at US $110/metric ton;
  (b) sodium hydroxide (100%) at US $500/metric ton;
  (c) antiscalant at US $3.30/kg (US $1.50/pound);
  (d) electricity at US $0.075/kwh;
  (e) water purchase and wastewater discharge costs (combined) at US $0.79/m³ (US $3/1,000 gallons).

Conversion of Existing RO System

Table 6 below assumes that an existing 5,700 m³ day (1.5 million USGPD) system operating at 75 percent recovery with feedwater shown in Table 5 is converted into a 90 percent recovery HERO brand RO process system and that no changes are made beyond the RO system.

In some cases, it may also be feasible to use a HERO brand RO process design to increase overall RO recovery rates, by processing reject from a conventional RO system, by (a) simultaneously reducing hardness and alkalinity in a WAC system, (b) decarbonation, and (c) raising the pH, before feeding the stream into a second RO system.

Conversion of existing systems may also provide unique opportunities to increase the capacity of an RO system. This is possible because the flux of about 611 L/m²/day (15 gfd) in a conventional RO system can be increased up to about 814 L/m²/day (20 gfd), or perhaps up to as much as 1014 L/m²/day (25 gfd), or more, when the operation is changed to a HERO brand RO process design and operation configuration.

New RO System Design and Operation

Figure 13:
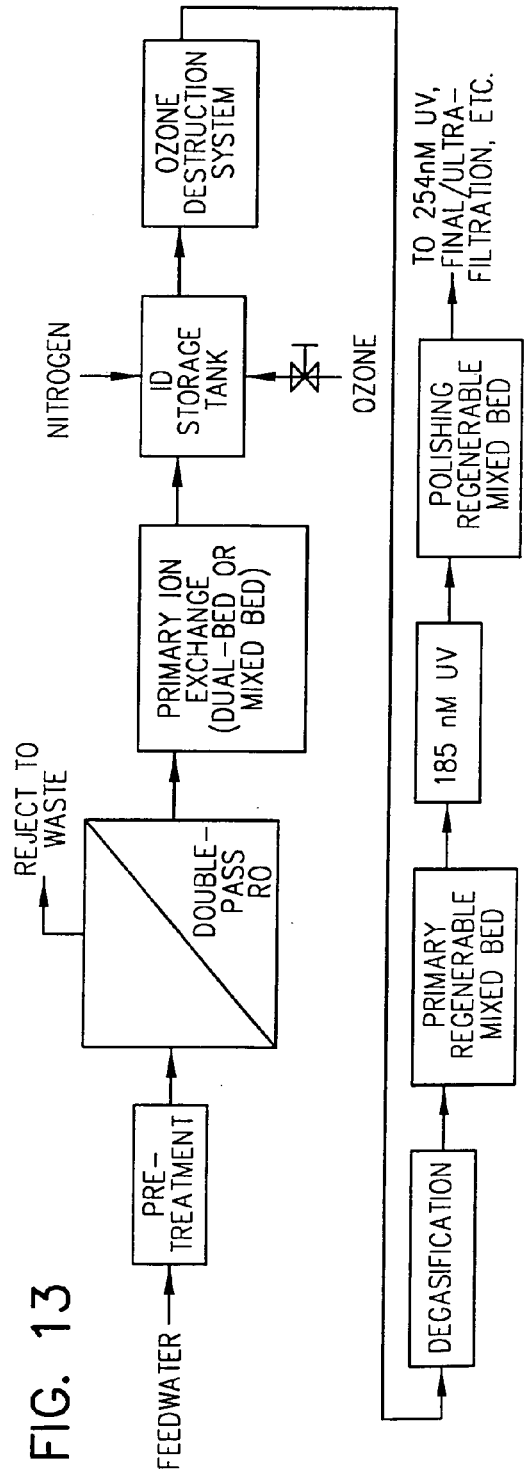
FIG. 13 illustrates a system schematic for a conventional RO system process design.
Figure 14:
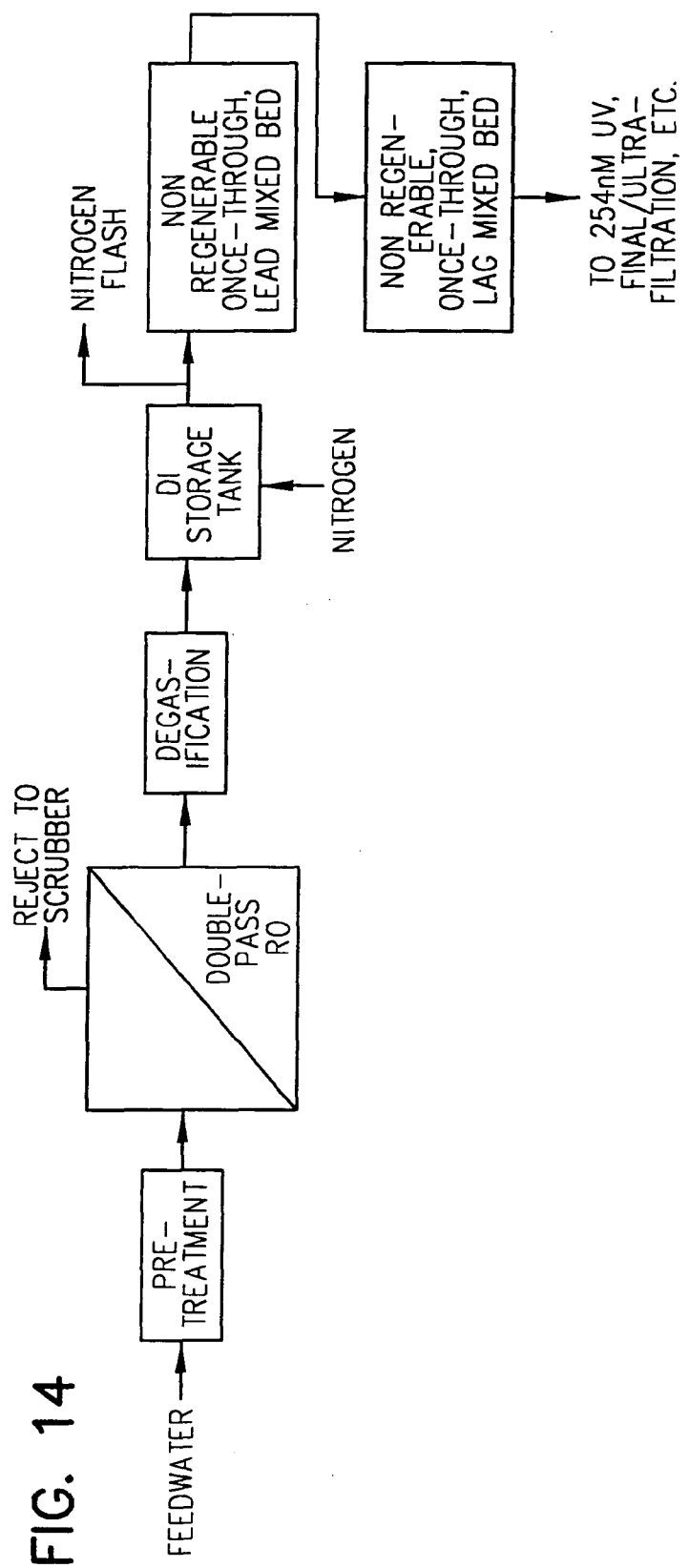
FIG. 14 illustrates an exemplary process flow diagram for my high efficiency RO process, utilizing the design and operational concepts taught herein.

The projection in Table 7 below is made on the basis that two brand new UPW systems will be built, in one case utilizing the conventional approach (see FIG. 13), and in the other case utilizing the HERO brand RO system (see FIG. 14) that includes a simplified polishing loop design. Both systems will use double-pass RO, hollow fine fiber ultra filter and no dual-bed ion exchangers. Approximately 40 percent of the UPW usage will be at high temperature, and the cost estimate includes DIW heaters. The distribution piping system beyond the ultra filtration system is not included in these cost estimates, nor is system installation or any PVDF lined storage tanks, since sizing of these components are very site specific.

Summary

The new HERO brand RO technology has been shown to exhibit very high rejection of all contaminants, especially weak acid anions. In addition, RO recovery of ninety percent (90%) or higher can be achieved with the vast majority of feedwater. Biological fouling is essentially eliminated while particulate fouling is substantially reduced. A flux considerably higher than is normally practical using conventional RO system design can be achieved with the new HERO technology. Although the benefits of this new process might justify higher UPW system cost, just the opposite is true. The overall cost as well as the complexity of the UPW system are both reduced dramatically.

The method and apparatus for processing water via membrane separation equipment, and in particular, via the HERO brand reverse osmosis ("RO") process design as described herein, provides a revolutionary, paradoxical result, namely, simultaneous increase in levels of silica in the RO reject, but with lower levels of silica in the purified RO permeate. This method of operating membrane separation systems, and in particular, for operating reverse osmosis systems, represents a significant option for reducing water use while simultaneously reducing capital and operating costs of the water treatment system. Water recovery, that is, the ratio of the quantity of the permeate product stream produced to the quantity of the feedwater stream provided is clearly in excess of about 50%, and easily will be up to about 85% or more, and often, will be up to about 95%, and, at times, will reach levels of about 99%. Further, given the efficiencies, dramatically less usage of chemical reagents, either for ion exchange regenerant or for RO cleaning, will be consumed per liter (gallon) of pure water produced.

The invention claimed is:

1. A composition matter consisting essentially of water and dissolved solutes,
    (a) said composition of matter being the product water resulting from the treatment of a feedwater stream in a first reverse osmosis membrane separation unit that produces a product water stream low in solutes and a reject stream high in solutes;
    (b) wherein said process comprises:
        (1) providing a feedwater stream containing solutes therein, said solutes comprising total dissolved solids (TDS), including (i) hardness, (ii) alkalinity, and (iii) at least one molecular species which is sparingly ionized when in neutral or near neutral pH aqueous solution;
        (2) effectively eliminating the tendency of said feedwater to form scale when said feedwater is concentrated at a selected pH of at least 9 to a preselected concentration factor in a first pass membrane separator unit, by effecting before concentration (i) removal of hardness from said feedwater stream; removal of substantially all alkalinity associated with hardness from said feedwater stream; and (iii) removing dissolved gas from said feedwater stream, whether initially present or created during said hardness removal or said alkalinity removal;
        (3) raising the pH of the pretreated feedwater stream to a selected pH of at least about 9 to urge said at least one molecular species which is sparingly ionized when in neutral or near neutral pH aqueous solution toward increased ionization; and
        (4) passing the pH adjusted pretreated feedwater stream through said first reverse osmosis membrane separation unit, said first reverse osmosis membrane unit operated at the selected pH so that it substantially resists passage of dissolved species therethrough, to concentrate said feedwater to said preselected concentration factor and to produce a low solute containing product water stream and a high solute containing reject stream;
    (c) said product water characterized in that has a pH greater than 9, and it comprises sodium (as ion), calcium (as ion) in an amount of less than 0.003 parts per million, and silica (as silica) in an amount of 0.46 parts per million or less, and wherein the ratio of sodium (as ions) to total dissolved solids (TDS) is about two thirds, or higher.

2. The product water as set forth in claim 1, wherein said product water comprises boron, and wherein the boron content (as ion) of said product water is 0.007 parts per million or less.

3. The product water as set forth in claim 1, further characterized in that said product water is essentially bacteria free.

4. The product water as set forth in claim 2, wherein the boron content (as ion) is lower than the silica content (as silica).

5. The product water as set forth in claim 1, wherein said feedwater stream comprises at least some Total Organic Carbon, and wherein said product water comprises at least some Total Organic Carbon, and wherein the content of said Total Organic Carbon in said product water is less than one percent of the Total Organic Carbon in said feedwater stream.

6. The product water as set forth in claim 5, wherein the Total Organic Carbon in said product water is less than 0.34% of the Total Organic Carbon in said feedwater stream.

7. A composition of matter comprising water and solutes therein,
    said composition of matter made by processing a feedwater in a first reverse osmosis membrane to produce said composition of matter as a low solute containing product water having total dissolved solids (TDS) therein, said composition of matter having a pH of between greater than 9 and less than 11.0, said composition characterized in that it comprises sodium (as ion), calcium (as ion) in an amount of less than 0.003 parts per million, silica (as silica) in an amount of 0.46 parts per million or less, and boron, and wherein the boron content (as ion) is 0.007 parts per million or less, and wherein the ratio of sodium (as ions) to total dissolved solids (TDS) is about two thirds, or higher; and
    wherein said feedwater comprises water containing solutes therein, said solutes comprising (i) hardness, (ii) alkalinity, and (iii) at least one molecular species which is sparingly ionized when in neutral or near neutral pH aqueous solution, said at least one molecular species comprising boron; and
    wherein said process comprises
    pretreating the feedwater to sufficiently remove scale forming substances from said feedwater stream so as to substantially eliminate scale accumulation in said first reverse osmosis membrane separation unit when said feedwater is concentrated to a preselected concentration factor at a selected pH, by effecting, in any order, two or more of the following, before concentrating said feedwater stream in said first reverse osmosis membrane separation unit:
        (i) removing hardness from said feedwater stream;
        (ii) removing substantially all non-hydroxide alkalinity associated with hardness from said feedwater stream;
        (iii) removing dissolved gas from said feedwater stream, whether initially present or created during said hardness or said alkalinity removal step;
    raising the pH of the pretreated feedwater stream to a selected pH of at least about 9, thereby increasing the ionization of one or more of said at least one molecular species which is sparingly ionized when in neutral or near neutral pH aqueous solution;
    passing the pH adjusted pretreated feedwater stream through said first reverse osmosis membrane separation unit, said first reverse osmosis membrane unit rejecting said at least one molecular species which is sparingly ionized when in neutral or near neutral pH aqueous solution by at least 95% while concentrating said feedwater stream to said preselected concentration factor, to produce said product water and a high solute containing reject stream.

8. The product water as set forth in claim 7, wherein the boron content (as ion) is lower than the silica content (as silica).

9. The product water as set forth in claim 7, wherein said product water comprises free hydroxide ions.

10. A composition matter consisting essentially of water and dissolved solutes,
(a) said composition of matter being the product water resulting from the treatment of a feedwater stream in a first reverse osmosis membrane separation unit that produces a product water stream low in solutes and a reject stream high in solutes;
(b) wherein said process comprises:
  (1) providing a feedwater stream containing solutes therein, said solutes comprising total dissolved solids (TDS) including (i) hardness, (ii) alkalinity, and (iii) at least one molecular species which is sparingly ionized when in neutral or near neutral pH aqueous solution;
  (2) effectively eliminating the tendency of said feedwater to form scale when said feedwater is concentrated at a selected pH of at least 9 to a preselected concentration factor in a first pass membrane separator unit, by effecting before concentration (i) removal of hardness from said feedwater stream, (ii) removal of substantially all alkalinity associated with hardness from said feedwater stream by means of (A) a single unit operation that comprises a weak acid cation ion-exchange system or (B) a sodium form strong acid cation ion-exchange system followed by acid addition, and (iii) then removing dissolved gas from said feedwater stream, whether initially present or created during said hardness or said alkalinity removal;
  (3) raising the pH of the pretreated feedwater stream to a selected pH of at least about 9 to urge said at least one molecular species which is sparingly ionized when in neutral or near neutral pH aqueous solution toward increased ionization; and
  (4) passing the pH adjusted pretreated feedwater stream through said first reverse osmosis membrane separation unit, said first reverse osmosis membrane unit operated at the selected pH so that it substantially resists passage of dissolved species therethrough, to concentrate said feedwater to said preselected concentration factor and to produce a low solute containing product water stream and a high solute containing reject stream;
(c) said product water characterized in that has a pH greater than 9, and it comprises sodium (as ion), calcium (as ion) in an amount of less than 0.003 parts per million, and silica (as silica) in an amount of 0.46 parts per million or less, and wherein the ratio of sodium (as ions) to total dissolved solids (TDS) is about two thirds, or higher.

11. The product water as set forth in claim 10, further characterized in that said product water is essentially bacteria free.

12. The product water as set forth in claim 10, wherein said feedwater stream comprises at least some Total Organic Carbon, and wherein said product water comprises at least some Total Organic Carbon, and wherein the content of said Total Organic Carbon in said product water is less than one percent of the Total Organic Carbon in said feedwater stream.

13. The product water as set forth in claim 12, wherein the Total Organic Carbon in said product water is less than 0.34% of the Total Organic Carbon in said feedwater stream.

14. A composition matter consisting essentially of water and dissolved solutes,
(a) said composition of matter being the product water resulting from the treatment of a feedwater stream in a first reverse osmosis membrane separation unit means that produces a product water stream low in solutes and a reject stream high in solutes;
(b) wherein said process comprises:
  (1) providing a feedwater stream containing solutes therein, said solutes comprising (i) hardness, (ii) alkalinity, and (iii) at least one molecular species which is sparingly ionized when in neutral or near neutral pH aqueous solution;
  (2) providing means for effectively eliminating the tendency of said feedwater to form scale when said feedwater is concentrated at a selected pH of at least 9 to a preselected concentration factor in a first pass membrane separator, by providing, before concentration (i) means for removal of hardness from said feedwater stream; (ii) means for removal of substantially all alkalinity associated with hardness from said feedwater stream; and (iii) means for removal of dissolved gas from said feedwater stream, whether initially present or created during said hardness removal or said alkalinity removal;
  (3) means for raising the pH of the pretreated feedwater stream to a selected pH of at least about 9 to urge said at least one molecular species which is sparingly ionized when in neutral or near neutral pH aqueous solution toward increased ionization; and
  (4) passing the pH adjusted pretreated feedwater stream through said first reverse osmosis membrane separation unit means, said first reverse osmosis membrane unit means operated at the selected pH so that it substantially resists passage of dissolved species therethrough, to concentrate said feedwater to said preselected concentration factor and to produce a low solute containing product water stream and a high solute containing reject stream;
(c) said product water characterized in that it has a pH greater than 9, and it comprises sodium (as ion), calcium (as ion) in an amount of less than 0.003 parts per million, and silica (as silica) in an amount of 0.46 parts per million or less, and wherein the ratio of sodium (as ions) to other solutes is about two thirds, or higher.

15. The product water as set forth in claim 14, wherein said product water comprises boron, and wherein the boron content (as ion) of said product water is 0.007 parts per million or less.

16. The product water as set forth in claim 15, wherein the boron content (as ion) is lower than the silica content (as silica).

17. The product water as set forth in claim 14, further characterized in that said product water is essentially bacteria free.

18. The product water as set forth in claim 14, wherein said feedwater stream comprises at least some Total Organic Carbon, and wherein said product water comprises at least some Total Organic Carbon, and wherein the content of said Total Organic Carbon in said product water is less than one percent of the Total Organic Carbon in said feedwater stream.

19. The product water as set forth in claim 18, wherein the Total Organic Carbon in said product water is less than 0.34% of the Total Organic Carbon in said feedwater stream.

20. The product water as set forth in claim 1, or in claim 7, or in claim 10, or in claim 14, wherein sodium (as ion) is present at about 0.955 ppm.

21. The product water as set forth in claim 1, or in claim 10, or in claim 14, wherein the pH of said product water is about 10.3.

22. The product water as set forth in claim 1 or in claim in claim 10 or in claim 9, wherein said product water comprises free hydroxide ions.

* * * * *